(12) United States Patent
Itoi

(10) Patent No.: US 8,241,595 B2
(45) Date of Patent: Aug. 14, 2012

(54) METHOD FOR MANUFACTURING POTASSIUM TITANATE

(75) Inventor: Nobuki Itoi, Tokushima (JP)

(73) Assignee: Otsuka Chemical, Co., Ltd., Osaka (JP)

( * ) Notice: Subject to any disclaimer, the term of this patent is extended or adjusted under 35 U.S.C. 154(b) by 0 days.

(21) Appl. No.: 12/929,949

(22) Filed: Feb. 25, 2011

(65) Prior Publication Data

US 2011/0158898 A1 Jun. 30, 2011

Related U.S. Application Data

(62) Division of application No. 12/078,685, filed on Apr. 3, 2008, now Pat. No. 7,901,659.

(60) Provisional application No. 60/907,591, filed on Apr. 10, 2007.

(30) Foreign Application Priority Data

Apr. 4, 2007 (JP) .................................. 2007-098808

(51) Int. Cl.
*C01G 23/00* (2006.01)
*C01G 23/04* (2006.01)
*C01D 13/00* (2006.01)
*C22B 26/10* (2006.01)

(52) U.S. Cl. ............... 423/202; 423/69; 423/71; 423/84; 423/179; 423/201; 423/206.1; 423/598; 423/594.15; 501/136

(58) Field of Classification Search .................... 423/69, 423/71, 84, 179, 201, 202, 206.1, 598, 594.16; 501/136

See application file for complete search history.

(56) References Cited

U.S. PATENT DOCUMENTS

| | | | |
|---|---|---|---|
| 6,036,938 A | 3/2000 | Konnai et al. | 423/598 |
| 6,251,361 B1 * | 6/2001 | Konnai et al. | 423/598 |
| 6,335,096 B1 | 1/2002 | Konnai | 428/402 |
| 6,579,619 B1 | 6/2003 | Konnai | 428/402 |
| 6,677,041 B1 | 1/2004 | Ogawa et al. | 428/402 |
| 7,122,490 B2 | 10/2006 | Kobayashi et al. | 501/98.4 |
| 7,208,485 B2 | 4/2007 | Adin et al. | 514/179 |
| 7,247,627 B2 | 7/2007 | Blasko et al. | 514/235.2 |
| 7,323,459 B2 | 1/2008 | Dolitzky et al. | 514/220 |
| 7,361,319 B2 | 4/2008 | Vierheilig | 423/213.2 |
| 2005/0186249 A1 * | 8/2005 | Riman et al. | 424/423 |

FOREIGN PATENT DOCUMENTS

EP 1 067 094 A1 1/2001

(Continued)

OTHER PUBLICATIONS

Bao, N., X. Feng, X. Lu, L. Shen, K. Yanagisawa, "Low-temperature controllable calcination syntheses of potassium dititanate," vol. 50 Issue 7 (Jul. 2004), pp. 1568-1577.*

(Continued)

*Primary Examiner* — Stanley Silverman
*Assistant Examiner* — Diana J Liao
(74) *Attorney, Agent, or Firm* — Kubovcik & Kubovcik

(57) ABSTRACT

A potassium titanate, method for manufacturing the potassium titanate, a friction material using the potassium titanate and a resin composition using the potassium titanate are disclosed. The potassium titanate is represented by $K_2Ti_nO_{(2n+1)}$ (n=4.0-11.0) and has the highest X-ray diffraction intensity peak (2θ) in the range of 11.0°-13.5° with its half width being not less than 0.5°.

6 Claims, 17 Drawing Sheets

FOREIGN PATENT DOCUMENTS

| | | |
|---|---|---|
| EP | 1 170 257 A1 | 1/2002 |
| JP | H10-316428 | 12/1998 |
| JP | 2000-256013 A | 9/2000 |
| JP | 2000-313620 A * | 11/2000 |
| JP | 2000-313620 A | 11/2000 |
| JP | 2001-106526 A | 4/2001 |
| JP | 2001-253712 A | 9/2001 |
| JP | 2003-335519 A * | 11/2003 |
| JP | 2003-335519 A | 11/2003 |
| WO | 00/66497 | 11/2000 |

OTHER PUBLICATIONS

Chinese Office Action issued Nov. 12, 2010, in Chinese Patent Appln. No. 200880007938.9 and English translation thereof.

"Ceramic Engineering Handbook", pp. 598-601, "3.4 Pulverization and Mechanochemistry" 1989.

X-ray Diffraction Chart submitted to the Japanese Patent Office in the counterpart Japanese patent application No. H09-046108.

Supplementary European Search Report issued Dec. 22, 2011, in European patent application No. 08722295.6-1218/2130798.

Database WPI Week 200233 Thomson Scientific, London, GB; AN2002-284207 XP002665811.

Toshitaka Oota et al. "Synthesis of Potassium Hexatitanate Fibers by The Hydrothermal Dehydration Method" Journal of Crystal Growth, vol. 46 No. 3, pp. 331-338, 1979.

* cited by examiner

METHOD FOR MANUFACTURING POTASSIUM TITANATE

This application is a division of application Ser. No. 12/078,685, filed Apr. 3, 2008, now U.S. Pat. No. 7,901,659, which claims priority of U.S. Provisional Application for Patent Ser. No. 60/907,591 filed Apr. 10, 2007 and Japanese Patent Application No. 2007-098808 filed Apr. 4, 2007, which are incorporated herein by reference.

BACKGROUND OF THE INVENTION

1. Technical Field

The present invention relates to potassium titanate, a manufacturing method thereof, a friction material containing the potassium titanate and a resin composition containing the potassium titanate.

2. Description of Related Art

Potassium titanate fiber, which is not a cancer-causing substance such as asbestos, has been widely used as a friction modifier, chiefly for incorporation in a vehicle brake pad. A friction material containing such potassium titanate fibers has a very favorable advantage that it causes no damage to a brake disk while exhibiting an excellent sliding property and a good braking effect.

However, the potassium titanate fibers, because of their fibrous form, present the following problems: they are bulky; they exhibit poor flowability; and they tend to get stuck on a wall of a feed passage during manufacture to eventually block it. In order to solve such problems, potassium titanate having a sheet or plate form, such as potassium octatitanate, potassium hexatitanate or potassium tetratitanate, has been proposed (see, for example, Japanese Patent Laid-Open Nos. 2001-106526 and 2001-253712).

However, there remains a need for further improvements in terms of wear resistance of a friction modifier, particularly in a high-temperature range.

In Japanese Patent Laid-Open No. 2000-256013, potassiumtitanate fine particles are proposed which have a major diameter of less than 5 μm. Although these potassium titanate fine particles exhibit a low X-ray diffraction intensity and show a diffraction line with a large half width, their friction and wear characteristics have been insufficient.

SUMMARY OF THE INVENTION

It is an object of the invention to provide potassium titanate which has a novel shape, exhibits excellent wear resistance when incorporated in a friction material and shows an excellent reinforcing performance when incorporated in a resin composition, a method for manufacture of the potassium titanate, a friction material containing the potassium titanate and a resin composition containing the potassium titanate.

The potassium titanate of the present invention is the one represented by $K_2Ti_nO_{(2n+1)}$ (n=4.0-11.0) and characterized as having the highest X-ray diffraction intensity peak (2θ) in the range of 11.0°-13.5° with its half width being not less than 0.5°.

The potassium titanate in the present invention has the highest X-ray diffraction intensity peak (2θ) in the range of 11.0°-13.5°, preferably in the range of 11.0°-12.5°. A half width of this peak is not less than 0.5°, preferably not less than 0.8°, more preferably not less than 1.0°. Characteristically, the potassium titanate of the present invention shows the highest X-ray diffraction intensity peak having a larger half width, compared to conventional potassium titanate.

The potassium titanate of the present invention generally has an indeterminate configuration, i.e., has an irregular form, instead of a fibrous, platy or particulate form. Specifically, it is preferably configured to include plural projections extending in irregular directions. That is, it preferably has a configuration like an amoeba or jigsaw puzzle piece.

A mean particle diameter of the potassium titanate of the present invention is preferably in the range of 5-20 μm. It can be measured as by a laser diffraction type particle-size distribution measurement device.

The potassium titanate of the present invention is preferably prepared from potassium dititanate which is obtained by firing a mixture obtained via mechanochemical milling of a titanium source and a potassium source. More specifically, the potassium titanate of the present invention is preferably prepared by subjecting the potassium dititanate to an acid treatment which dissolves a potassium content therefrom and then firing the potassium dititanate. Like the potassium titanate of the present invention, this potassium dititanate has the above-described indeterminate configuration.

The milled mixture obtained via mechanochemical milling is highly reactive, as will be described below. Accordingly, the potassium dititanate obtained as a result of firing of such a highly reactive milled mixture is believed to be also highly reactive. By subjecting such highly reactive potassium dititanate to an acid treatment such that its potassium content dissolves to result in a desired potassium titanate composition, and subsequently firing the potassium dititanate, the potassium titanate of the present invention can be obtained.

The manufacturing method of the potassium titanate of the present invention is characterized as including the steps of mixing a titanium source and a potassium source while milling them mechanochemically, firing the milled mixture to prepare potassium dititanate and, subsequent to an acid treatment which dissolves a potassium content therefrom, firing the potassium dititanate.

Since the milled mixture obtained by mixing a titanium source and a potassium source while mechanochemically milling them is highly reactive, as described above, the potassium dititanate obtained by firing the milled mixture is believed to be also highly reactive. By subjecting such potassium dititanate to an acid treatment so that its potassium content dissolves to result in a desired potassium titanate composition as a final product, and subsequently firing the potassium dititanate, the potassium titanate of the present invention can be obtained.

A useful titanium source is a compound containing titanium oxide. Specific examples of titanium sources include titanium oxide, rutile ore, titanium hydroxide wet cake and hydrated titania.

A useful potassium source is a compound which when heated produces potassium oxide. Specific examples of potassium sources include potassium oxide, potassium carbonate, potassium hydroxide and potassium nitrate. The use of potassium carbonate, among them, is particularly preferred.

The blending ratio of the titanium source and potassium source is basically Ti:K=1.0:1.0 (molar ratio). However, it can be varied within about 5%.

In the manufacturing method of the present invention, mechanochemical milling may be effected by a method wherein the mixture is milled while it is subjected to a physical impact. Specifically, milling may be achieved by a vibration mill. When a milling treatment is carried out using a vibration mill, a shear stress is produced in the powder-form mixture due to milling. This shear stress is believed to cause both disorder of an atomic configuration and reduction of an interatomic distance, so that atomic migration occurs at a contact portion of dissimilar particles and, as a result, a metastable phase is obtained. This is believed to result in obtaining the highly reactive milled mixture.

In the manufacturing method of the present invention, the milled mixture obtained in the manner as described above is fired to prepare potassium dititanate. A firing temperature of the milled mixture is fired is preferably in the range of 650-1,000° C., more preferably in the range of 720-880° C. A firing time is preferably 0.5 hours-6 hours, more preferably 3 hours-5 hours. If the firing temperature is excessively low, fibrous potassium tetratitanate may be produced to result in the difficulty to obtain a single composition of amoebiform potassium dititanate. On the other hand, if it is excessively high, the potassium dititanate may be rendered columnar in configuration to result in the difficulty to obtain amoebiform potassium dititanate. If the firing time is excessively short, fibrous potassium tetratitanate may be produced to result in the difficulty to obtain a single composition of amoebiform potassium dititanate. On the other hand, if the firing time is excessively long, a production efficiency may be lowered to lose an industrial suitability.

In the manufacturing method of the present invention, the potassium dititanate obtained in the manner as described above is then subjected to an acid treatment to dissolve its potassium content. In the case where potassium octatitanate (n=8) or potassium titanate having a close composition (n=7.50-8.49) is manufactured, addition of an acid is preferably followed by adjustment of a pH to a range between 7.5 and 8.5. In the case where potassium hexatitanate (n=6) or potassium titanate having a close composition (n=5.50-6.49) is manufactured, addition of an acid is preferably followed by adjustment of a pH to a range between 11.5 and 12.5. In the case where potassium tetratitanate (n=4) or potassium titanate having a close composition (n=3.50-4.49) is manufactured, addition of an acid is preferably followed by adjustment of a pH to a range between 13.0 and 13.5.

The acid used in the acid treatment is not particularly specified. Examples of useful acids include inorganic acids such as sulfuric acid, hydrochloric acid and nitric acid; and organic acids such as acetic acid. These acids may be used alone or in combination.

After dissolution of the potassium content, the resultant is filtrated such as under vacuum and then dewatered. Firing follows dewatering to provide a final product, i.e., the potassium titanate of the present invention. This firing is preferably performed at a temperature in the range of 400-700° C., more preferably in the range of 450-650° C. A firing time is preferably 0.5 hours-4 hours, more preferably 0.5 hours-1 hour. If the firing temperature is excessively low, it may become difficult to obtain a purposed X-ray diffraction pattern or a tunnel crystal structure. On the other hand, if the firing temperature is excessively high, titanium oxide may deposit to result in the difficulty to obtain a single composition. If the firing time is excessively short, it may become difficult to obtain a purposed X-ray diffraction pattern or a tunnel crystal structure. On the other hand, if the firing time is excessively long, a production efficiency may be lowered to lose an industrial suitability.

Firing of the milled mixture and the potassium dititanate subsequent to the acid treatment can be achieved by various firing means, including an electric furnace, rotary kiln, tube furnace, fluidized bed kiln and tunnel kiln.

After the firing, crushing and milling are performed using a jaw crusher, pin mill or the like. When necessary, screening or classification may be performed.

As described above, the potassium titanate of the present invention can be manufactured according to the manufacturing method of the present invention.

The friction material of the present invention is characterized as containing the potassium titanate of the present invention as a friction modifier. Preferably, the potassium titanate of the present invention is contained in the range of 1-80% by weight. If the content of the potassium titanate of the present invention is less than 1% by weight, it may become difficult for the potassium titanate to exhibit its effect as a friction modifier, such as stability of a friction coefficient. If the content exceeds 80% by weight, pad formation may become difficult.

Due to the inclusion of the potassium titanate of the present invention as a friction modifier, the friction material of the present invention can exhibit very stable friction and wear characteristics (wear resistance, friction coefficient, etc.) over a low to high temperature range. The detailed reason for the improvements in friction and wear characteristics when the potassium titanate of the present invention is contained is not clear. It is however believed that the improved wear resistance and friction coefficient of the friction material are attributed to the above-specified configuration of the potassium titanate of the present invention.

Accordingly, the friction material of the present invention can be used as a material for braking members incorporated in automobiles, railway vehicles, aircrafts and other various industrial apparatuses. For example, it can be used as a material for clutch facings or brakes such as brake linings and disc pads. It effectively improves and stabilizes their braking functions and offers a service life improving effect.

Any binder conventionally used in the friction material field can be used. Examples of binders include organic binders and inorganic binders. Examples of organic binders include thermosetting resins such as phenol, formaldehyde, melamine, epoxy, acrylic, aromatic polyester and urea resins; elastomers such as natural rubber, nitrile rubber, butadiene rubber, styrene-butadiene rubber, chloroprene rubber, polyisoprene rubber, acrylic rubber, high styrene rubber and styrene-propylene-diene copolymer; thermoplastic resins such as polyamide, polyphenylene sulfide, polyether, polyimide, polyether ether ketone and thermoplastic liquid crystalline polyester resins. Examples of inorganic binders include alumina sol, silica sol and silicone resins. These binders may be used alone or in combination. In some cases, two or more binders which are compatible with each other may be used in combination.

The friction material may contain fibers. Any type of fibers conventionally used in this field can be used. Examples of fibers include resin fibers such as aramid fibers, metal fibers such as steel fibers and brass fibers, carbon fibers, glass fibers, ceramic fibers, rock wool, wood pulps and the like. These types of fibers may be used alone or in combination. For the purpose of improving dispersibility and adherence to the binder, such fibers may be surface treated with a silane coupling agent such as an amino, epoxy or vinyl silane coupling agent, a titanate coupling agent, a phosphate ester or the like.

Also, the friction material of the present invention may further contain a friction modifier conventionally used in this field within the range that does not impair the desired effect of the friction material. Examples of friction modifiers include organic powders such as vulcanized or unvulcanized natural or synthetic rubber powder, cashew resin powder, resin dust and rubber dust; inorganic powders such as carbon black, graphite powder, molybdenum disulfide, barium sulfate, calcium carbonate, clay, mica, talc, diatomite, antigorite, sepiolite, montmorillonite, zeolite, sodium trititanate, sodium hexatitanate, potassium hexatitanate and potassium octatitanate; metal powders such as copper, aluminum, zinc and iron; oxide powders such as alumina, silica, chromium oxide, titanium oxide and iron oxide; and the like. These conventional friction modifiers may be used alone or in combination when necessary.

The friction material of the present invention may further contain one or more of a rust inhibitor, a lubricant, an abrasive and the like.

The blending ratio of components in the friction material of the present invention can be suitably selected from a wide range depending upon various conditions which include the type of the binder used; the types of the optionally incorporated fibers, conventional friction modifier and other additives; the sliding and mechanical properties required for the target friction material and the contemplated use purposes of the friction material. In general, the binder may be contained in the amount of 5-60% by weight (preferably 10-40% by weight), the friction modifier in the amount of 1-80% by weight (preferably 3-50% by weight), the fibers in the amount of up to 60% by weight (preferably 1-40% by weight) and the other additives in the amount of up to 60% by weight, all based on the total weight of the friction material.

The friction material of the present invention can be manufactured in accordance with a conventionally-known method for manufacturing a friction material. For example, fibers, if necessary, are dispersed in a binder. A friction modifier and other optional components are subsequently added, either in a mixed form or separately, to the dispersion. The resulting mixture is then poured in a mold where it is heat compressed into an integral form.

Alternatively, a binder is melt kneaded in a twin-screw extruder into which optional fibers, a friction modifier and other optional components are introduced, either in a mixed form or separately, from a side hopper. The melt mixture is extruded and then machined to a desired shape.

Alternatively, fibers, if necessary, are dispersed in a binder. A friction modifier and other optional components are subsequently added to the dispersion. The resulting mixture is dispersed in water, caught on a net and then dewatered to provide a sheet web which is subsequently heat pressed into an integral form. The resultant is appropriately cut and/or abrasive machined to a desired shape.

The resin composition of the present invention is characterized as including the potassium titanate of the present invention. Inclusion of the potassium titanate of the present invention results in obtaining reinforcement and other performances. The resin composition preferably contains the potassium titanate of the present invention in the range of 5-50% by weight. If the amount falls below 5% by weight, the effect obtained via inclusion of the potassium titanate of the present invention may become insufficient. On the other hand, if the amount exceeds 50% by weight, dispersion of the potassium titanate in the resin may become insufficient. In such a case, a reinforcing or other effect is difficult to obtain.

The resin for use in the resin composition of the present invention may be either thermoplastic or thermosetting.

Examples of thermoplastic resins include polyethylene, polystyrene, AS resin, ABS resin, polypropylene, vinyl chloride resin, methacrylic resin, polyethylene terephthalate, polyamide, polycarbonate, polyacetal, modified polyphenylene ether, polybutylene terephthalate, polyphenylene sulfide, polyarylate, polysulfone, polyether sulfone, polyether ether ketone, polyether imide, polyamide imide, liquid crystal polymer, polyimide, polyphthal amide, fluororesin, ultra-high-molecular-weight polyethylene, thermoplastic elastomer, polymethyl pentene, biodegradable plastic, polyacrylonitrile and cellulosic plastic.

Examples of thermosetting resins include phenol resin, urea resin, melamine resin, epoxy resin, unsaturated polyester resin, polyurethane, diallyl phthalate resin, silicone resin and alkyd resin.

The potassium titanate of the present invention, when used as a friction modifier in a friction material, imparts excellent wear resistance and, when contained in a resin composition, exhibits an excellent reinforcement performance.

DESCRIPTION OF THE PREFERRED EXAMPLES

The following specific examples illustrate the present invention but are not intended to be limiting thereof.

EXAMPLE 1

Preparation of Milled Mixture 418.9 g of titanium oxide and 377.05 g of potassium carbonate were mixed in a Henshel mixer. The resulting mixture was further mixed while milled in a vibration mill for 0.5 hours.

Figure 5:
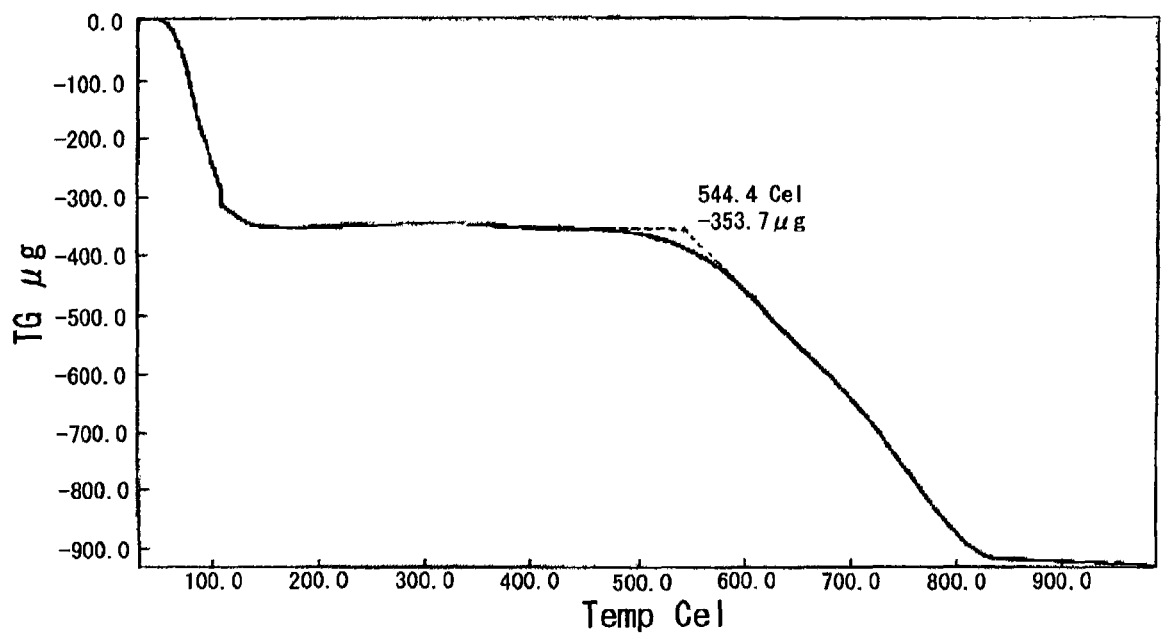
FIG. 5 is a graph, showing a T-G curve of the mixture obtained via milling by a vibration mill.

FIG. 5 is a graph which shows a T-G curve of the milled mixture obtained. For a comparative purpose, they were only mixed in a Henshel mixer to prepare a mixture. Its T-G curve is shown in FIG. 6.

Figure 6:
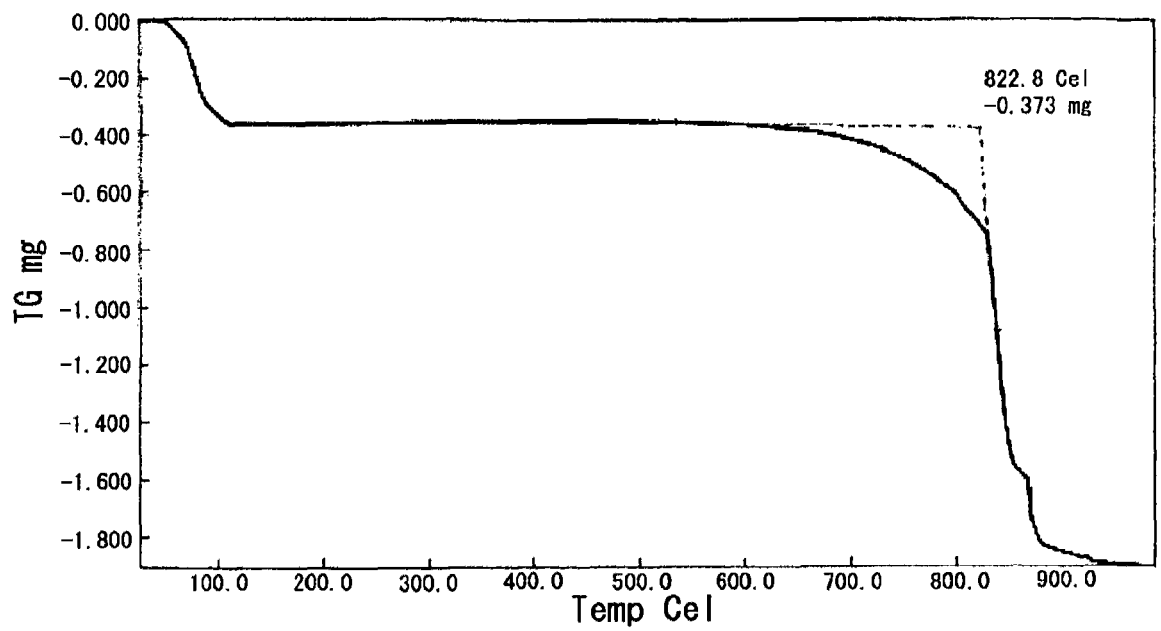
FIG. 6 is a graph, showing a T-G curve of the mixture obtained through a Henshel mixer.

As apparent from comparison between FIGS. 5 and 6, the milled mixture obtained via mixing with mechanochemical milling in a vibration mill shows a start of weight reduction at a lower temperature, compared to the mixture obtained via mixing in a Henshel mixer. This is believed to demonstrate that the mixture obtained via mixing with mechanochemical milling has an increased reactivity.

(Preparation of Potassium Dititanate)

The milled mixture obtained according to the above-described procedure, weighing 50 g, was packed in a crucible and fired in an electric furnace at 780° C. for 4 hours. The obtained product was confirmed as $K_2Ti_2O_5$ by X-ray diffraction.

(Acid Treatment and Firing)

The obtained potassium dititanate ($K_2Ti_2O_5$) was used to prepare 500 ml of a 15 wt. % slurry. Its pH was adjusted to a value of 8 by addition of 12.4 g of a 70 wt. % aqueous solution of $H_2SO_4$ and subsequent one-hour stirring. This slurry was filtrated, dried and then fired in an electric furnace at 600° C. for 1 hour.

The fired product was disintegrated by a hammer mill to obtain 28.92 g of potassium titanate.

Figure 1:
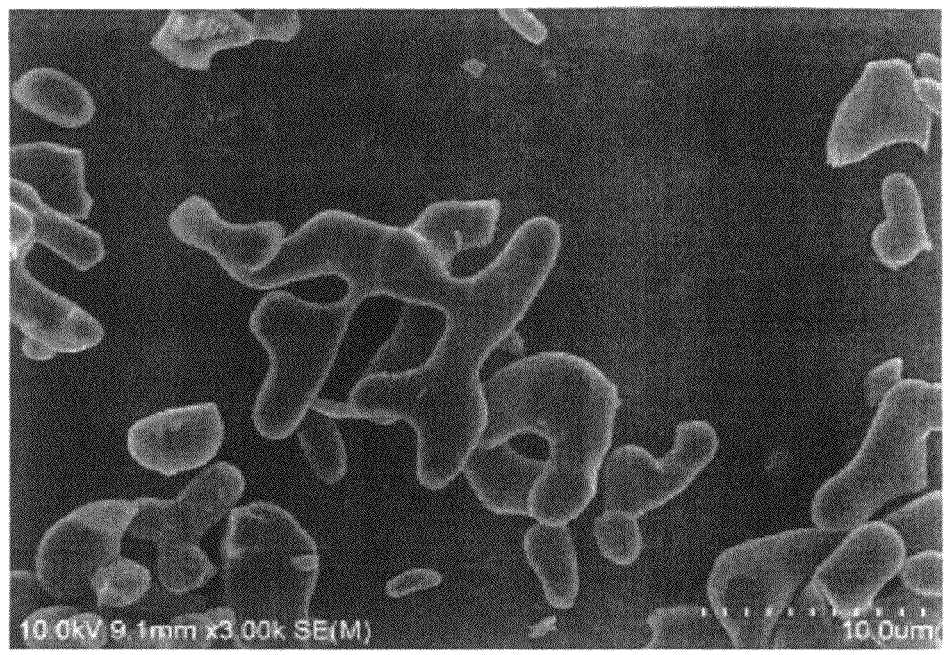
FIG. 1 is a photomicrograph taken using a scanning electron microscope, showing the potassium titanate of Example 1 in accordance with the present invention.
Figure 2:
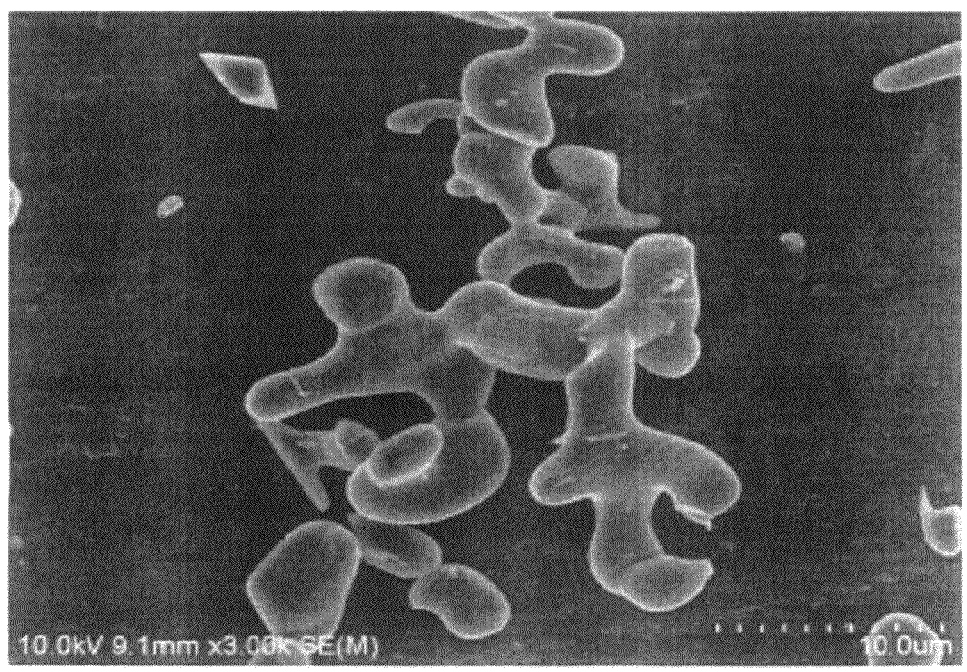
FIG. 2 is another photomicrograph taken using a scanning electron microscope, showing the potassium titanate of Example 1 in accordance with the present invention.

The obtained potassium titanate was observed with a scanning electron microscope (SEM). FIGS. 1 and 2 are photomicrographs of the potassium titanate when taken using a scanning electron microscope.

As can be clearly seen from FIGS. 1 and 2, the potassium titanate obtained has an indeterminate shape, i.e., has plural projections extending in irregular directions. In other words, it has a configuration like an amoeba or jigsaw puzzle piece.

Figure 25:
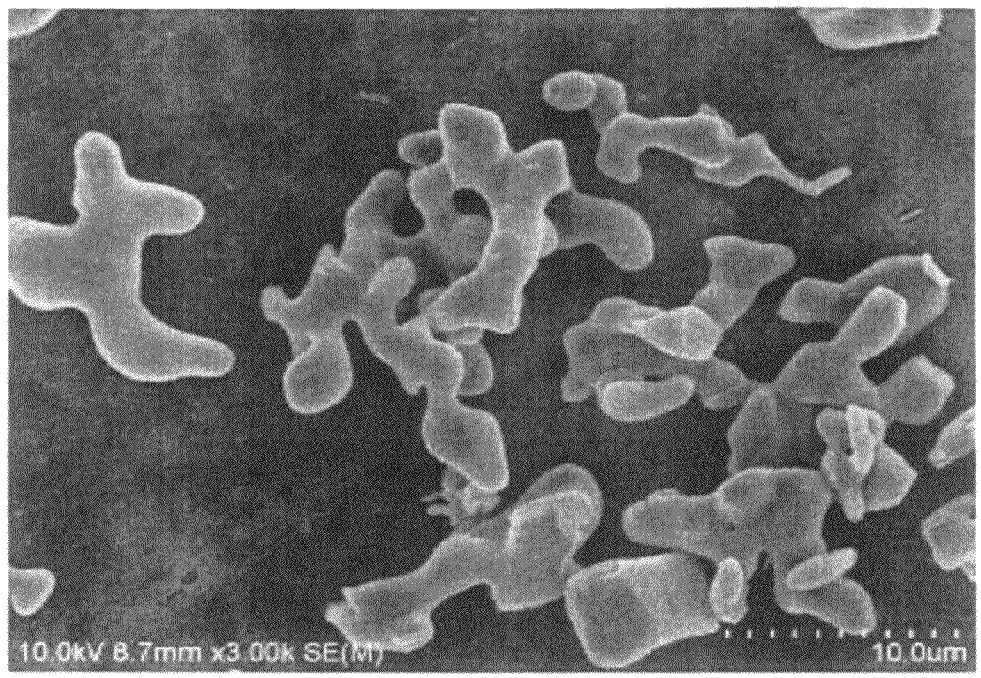
FIG. 25 is a photomicrograph taken using a scanning electron microscope, showing the potassium dititanate prepared in Examples in accordance with the present invention.
Figure 26:
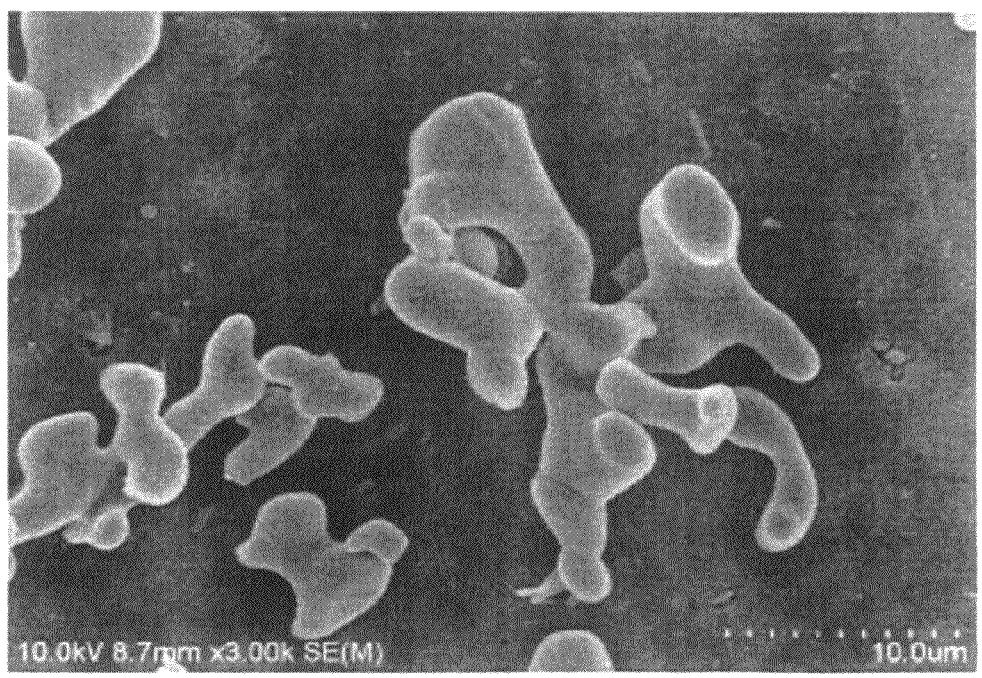
FIG. 26 is another photomicrograph taken using a scanning electron microscope, showing the potassium dititanate prepared in Examples in accordance with the present invention.

FIGS. 25 and 26 are SEM photographs of the potassium dititanate serving as a raw material. This potassium dititanate also has a configuration like an amoeba or jigsaw puzzle piece.

The potassium titanate obtained was confirmed as having a composition of $K_2Ti_{7.9}O_{6.8}$ by fluorescent X-ray analysis.

Figure 7:
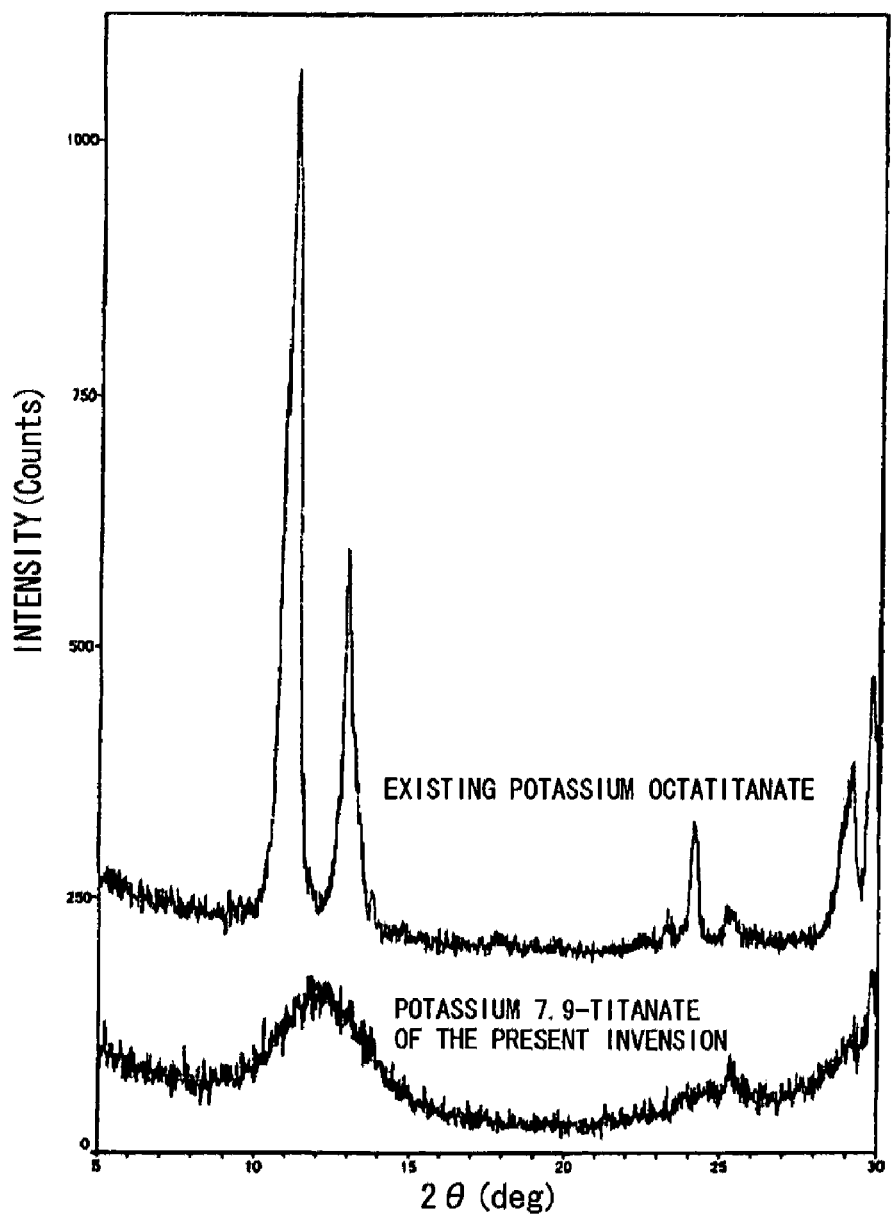
FIG. 7 is an X-ray diffraction chart of the potassium titanate obtained in Example 1 in accordance with the present invention.

FIG. 7 shows an X-ray diffraction chart of the potassium titanate (potassium 7.9-titanate of the present invention). FIG. 7 also shows an X-ray diffraction chart of fibrous potassium octatitanate (existing potassium octatitanate).

As shown in FIG. 7, the highest intensity peak appeared at an angle of 12.12° and a half width of this peak was 3.247°. X-ray diffraction determination was performed using an X-ray diffraction measurement device (product of Rigaku Industrial Corp., RINT 2000). After smoothing using a weighted average method and background removal using a Sonnevelt-Visser method, peak searching was performed to determine the half width.

On the other hand, in the X-ray diffraction chart of the fibrous potassium octatitanate, the highest intensity peak appeared at an angle of 11.335° and a half width of this peak was 0.235°.

Accordingly, the potassium titanate obtained in this Example has the highest intensity peak at a location away from a location at which that of the fibrous potassium octatitanate appears and its half width is larger than that of the conventional fibrous potassium octatitanate.

A mean particle diameter (median diameter) of the potassium titanate of this Example was 11.0 μm.

Also, the potassium titanate of this Example has an amoebic configuration, as shown in FIGS. 1 and 2, and its configuration is distinctly different from a fibrous, platy or particulate configuration of the conventional potassium octatitanate.

EXAMPLE 2

Potassium dititanate ($K_2Ti_2O_5$) was prepared in the same manner as in Example 1 and used to prepare 500 ml of a 15 wt. % slurry. Its pH was adjusted to a value of 12 by addition of 10.4 g of a 70 wt. % aqueous solution of $H_2SO_4$ and subsequent one-hour stirring. This aqueous slurry was filtrated, dried and then fired in an electric furnace at 600° C. for 1 hour. The fired product was disintegrated by a hammer mill to obtain 29.88 g of potassium titanate.

The obtained potassium titanate was confirmed as having a composition of $K_2Ti_{6.1}O_{13.2}$ by fluorescent X-ray analysis.

Figure 8:
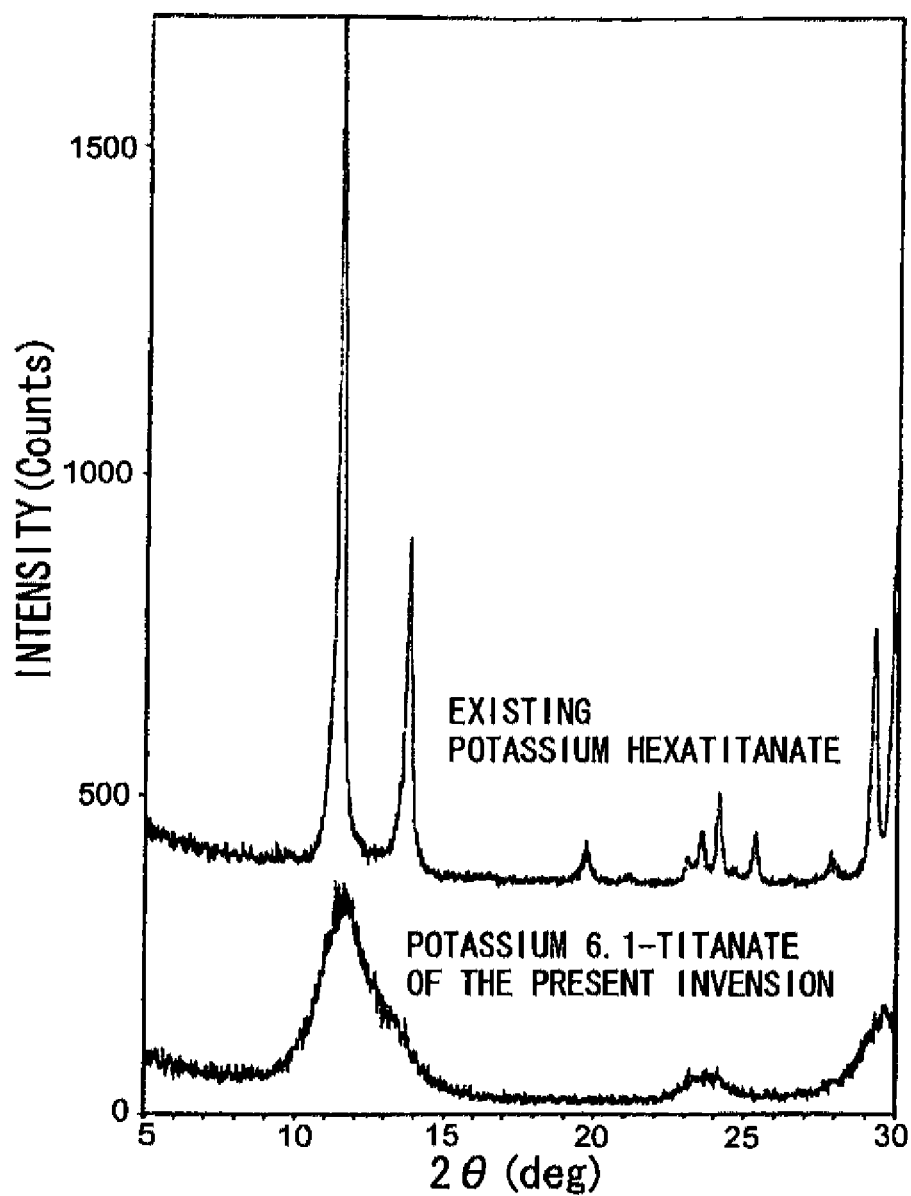
FIG. 8 is an X-ray diffraction chart of the potassium titanate obtained in Example 2 in accordance with the present invention.

FIG. 8 shows an X-ray diffraction chart of the potassium titanate (potassium 6.1-titanate of the present invention). FIG. 8 also shows an X-ray diffraction chart of fibrous potassium hexatitanate (existing potassium hexatitanate). As shown in FIG. 8, the potassium titanate of this Example had the highest intensity peak at an angle of 11.58° and its half width was 1.388°. On the other hand, the conventional fibrous potassium hexatitanate had the highest intensity peak at an angle of 11.484° and its half width was 0.188°.

Figure 3:
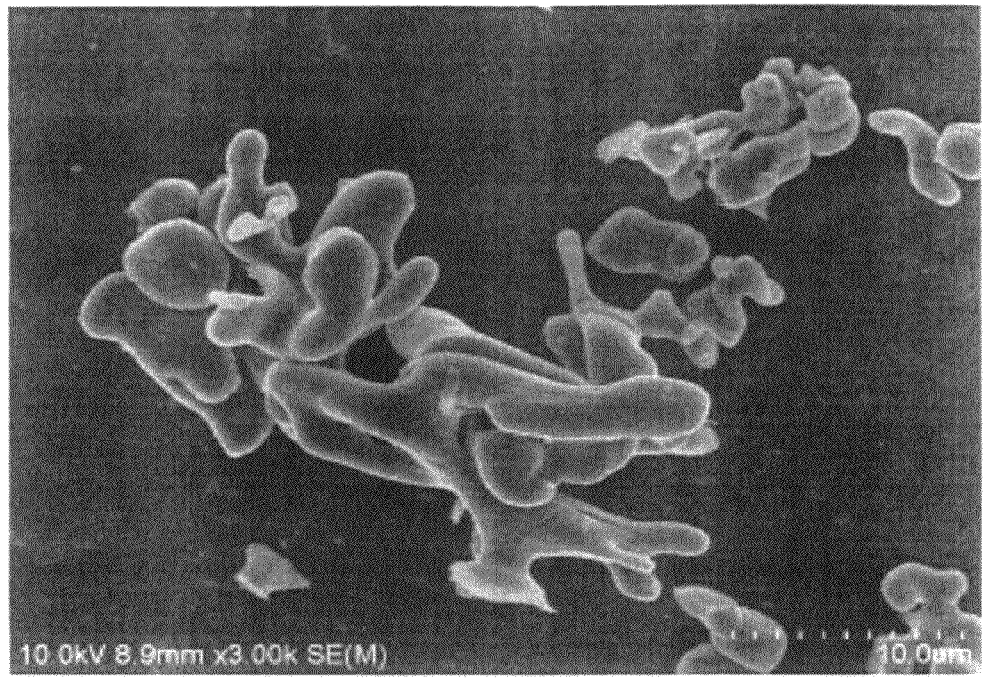
FIG. 3 is a photomicrograph taken using a scanning electron microscope, showing the potassium titanate of Example 2 in accordance with the present invention.
Figure 4:
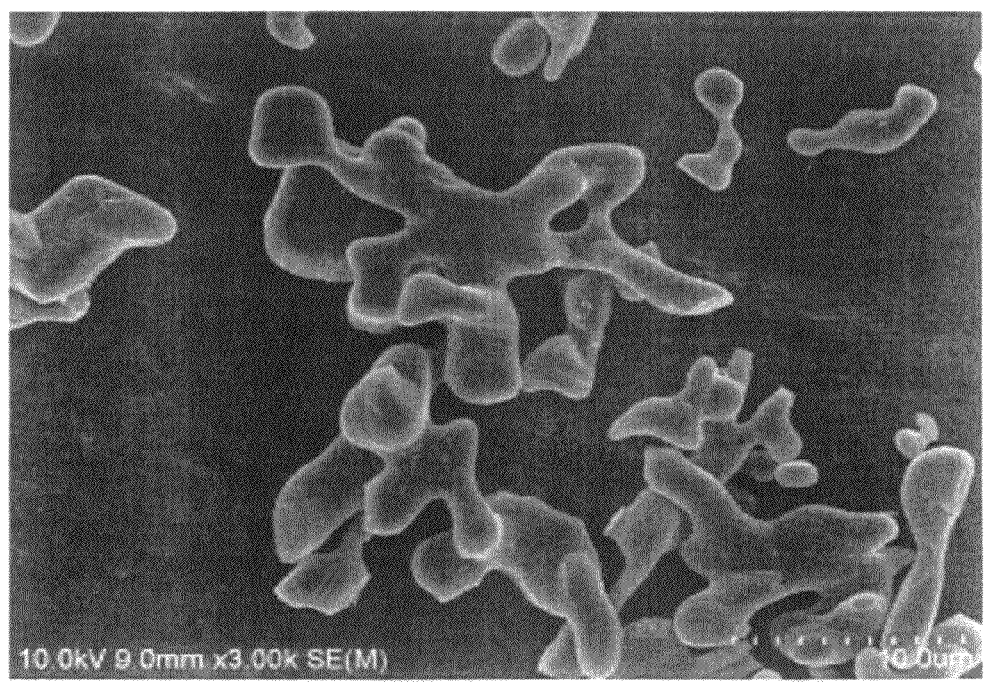
FIG. 4 is another photomicrograph taken using a scanning electron microscope, showing the potassium titanate of Example 2 in accordance with the present invention.

FIGS. 3 and 4 are SEM photographs of the potassium titanate of this Example.

A mean particle diameter (median diameter) of the potassium titanate of this Example was 13.2 μm.

EXAMPLE 3

Potassium dititanate ($K_2Ti_2O_5$) was prepared in the same manner as in Example 1 and used to prepare 500 ml of a 3 wt. % slurry. Its pH was adjusted to a value of 12.8 by one-hour stirring. This slurry was filtrated, dried and then fired in an electric furnace at 600° C. for 1 hour. The fired product was disintegrated by a hammer mill to obtain 30.86 g of potassium titanate.

The obtained potassium titanate was confirmed as having a composition of $K_2Ti_{4.8}O_{10.6}$ by fluorescent X-ray analysis.

Figure 9:
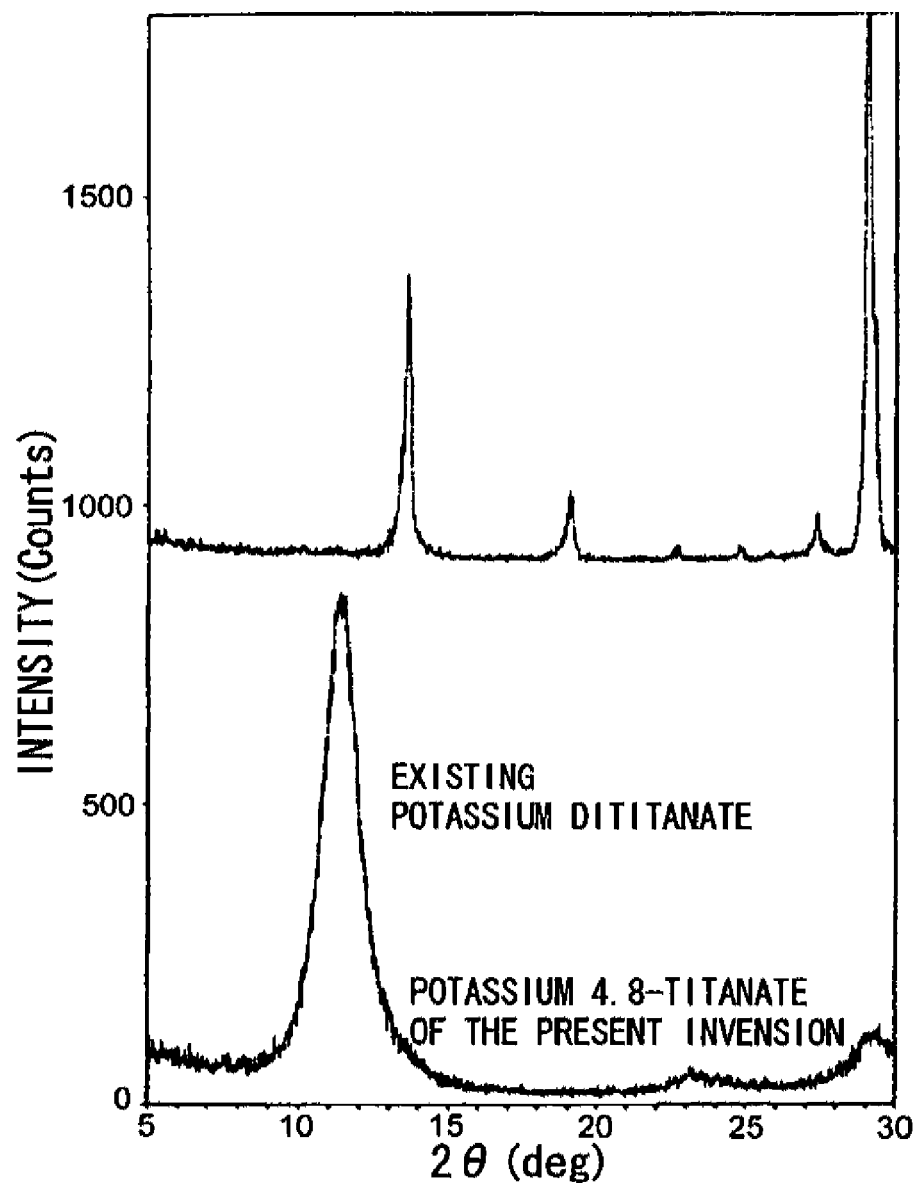
FIG. 9 is an X-ray diffraction chart of the potassium titanate obtained in Example 3 in accordance with the present invention.

FIG. 9 shows an X-ray diffraction chart of the obtained potassium titanate (potassium 4.8-titanate of the present invention). FIG. 9 also shows an X-ray diffraction chart of potassium dititanate (existing potassium dititanate). As shown in FIG. 9, the potassium titanate of this Example had the highest intensity peak at an angle of 11.38° and its half width was 1.082°. On the other hand, the potassium dititanate had the highest intensity peak at an angle of 13.58° and its half width was 0.212°.

Figure 17:
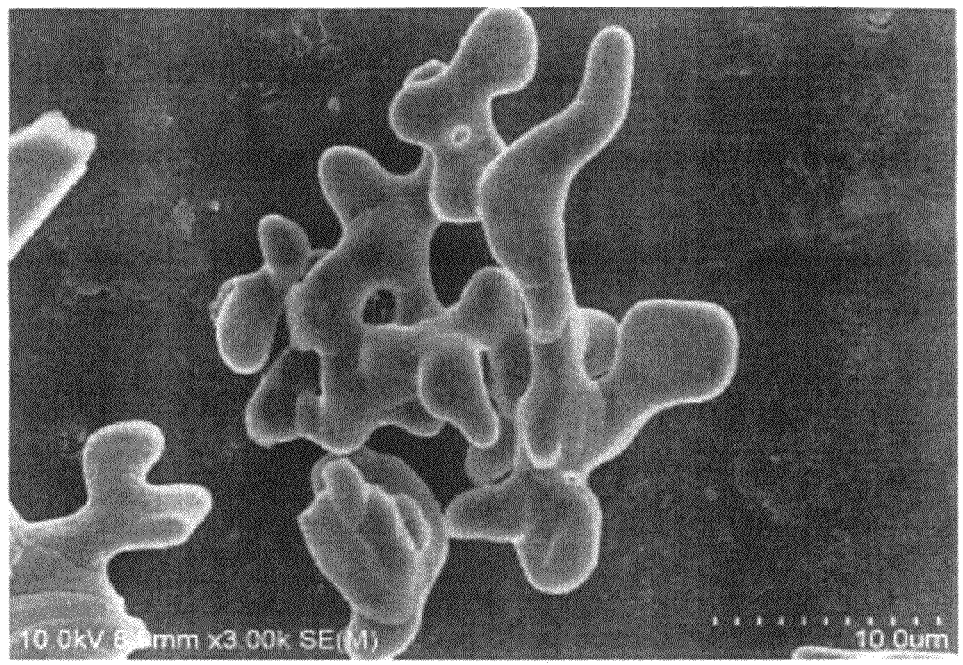
FIG. 17 is a photomicrograph taken using a scanning electron microscope, showing the potassium titanate of Example 3 in accordance with the present invention.
Figure 18:
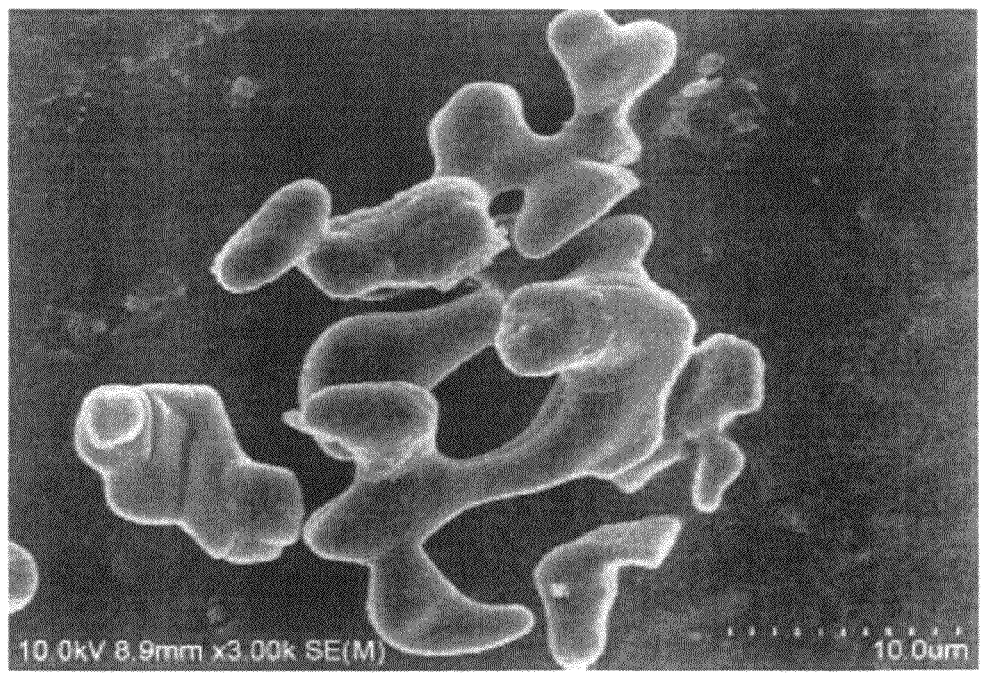
FIG. 18 is another photomicrograph taken using a scanning electron microscope, showing the potassium titanate of Example 3 in accordance with the present invention.

FIGS. 17 and 18 are SEM photographs of the potassium titanate of this Example.

A mean particle diameter (median diameter) of the potassium titanate of this Example was 12.2 µm.

EXAMPLE 4

Potassium dititanate ($K_2Ti_2O_5$) was prepared in the same manner as in Example 1 and used to prepare 500 ml of a 15 wt. % slurry. Its pH was adjusted to a value of 6 by addition of 14.0 g of a 70 wt. % aqueous solution of $H_2SO_4$ and subsequent one-hour stirring. This aqueous slurry was filtrated, dried and then fired in an electric furnace at 600° C. for 1 hour. The fired product was disintegrated by a hammer mill to obtain 28.02 g of potassium titanate.

The obtained potassium titanate was confirmed as having a composition of $K_2Ti_{10.9}O_{22.8}$ by fluorescent X-ray analysis.

Figure 10:
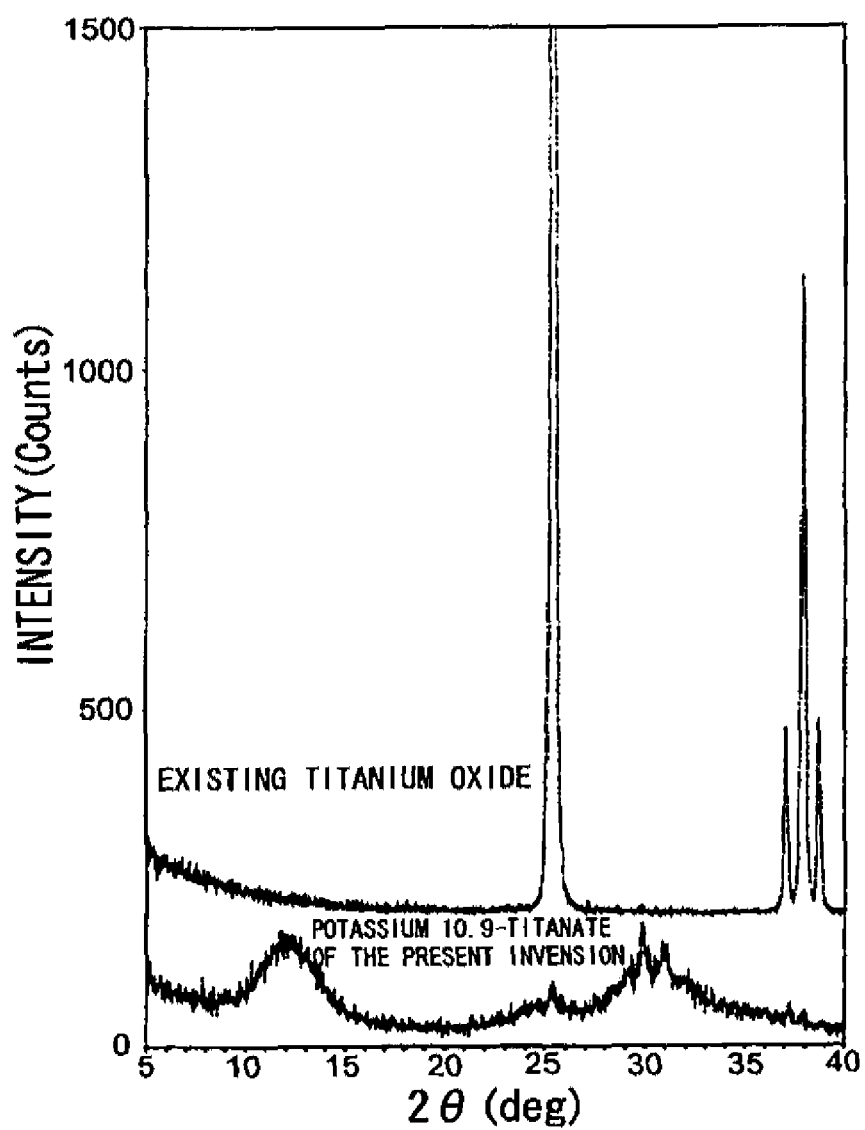
FIG. 10 is an X-ray diffraction chart of the potassium titanate obtained in Example 4 in accordance with the present invention.

FIG. 10 shows an X-ray diffraction chart of the obtained potassium titanate (potassium 10.9-titanate of the present invention). FIG. 10 also shows an X-ray diffraction chart of titanium oxide (existing titanium oxide). As shown in FIG. 10, the potassium titanate of this Example had the highest intensity peak at an angle of 11.42° and its half width was 1.106°. On the other hand, the titanium oxide had the highest intensity peak at an angle of 25.30° and its half width was 0.165°.

Figure 19:
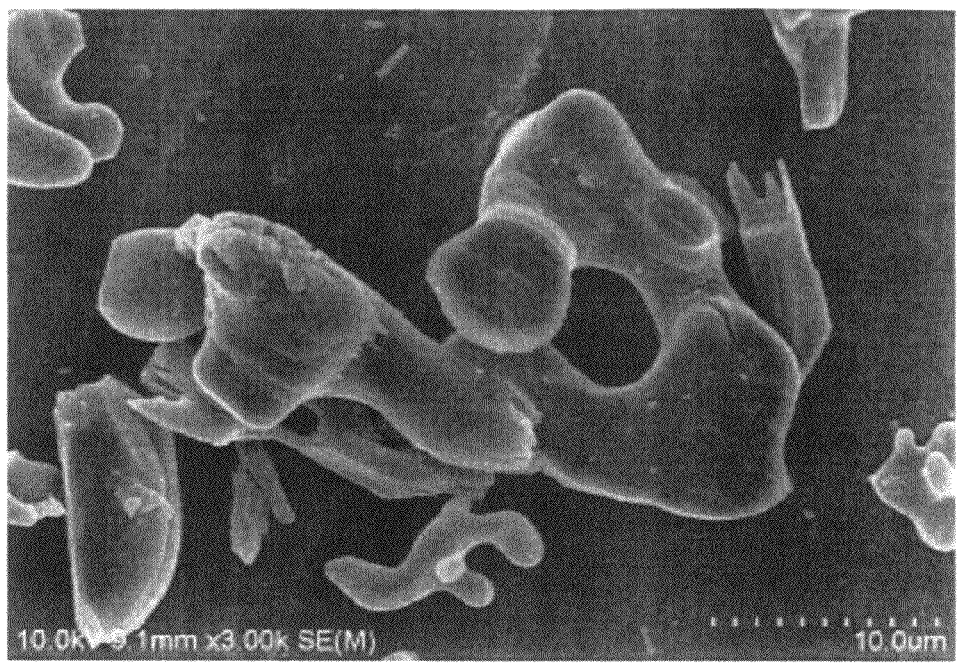
FIG. 19 is a photomicrograph taken using a scanning electron microscope, showing the potassium titanate of Example 4 in accordance with the present invention.
Figure 20:
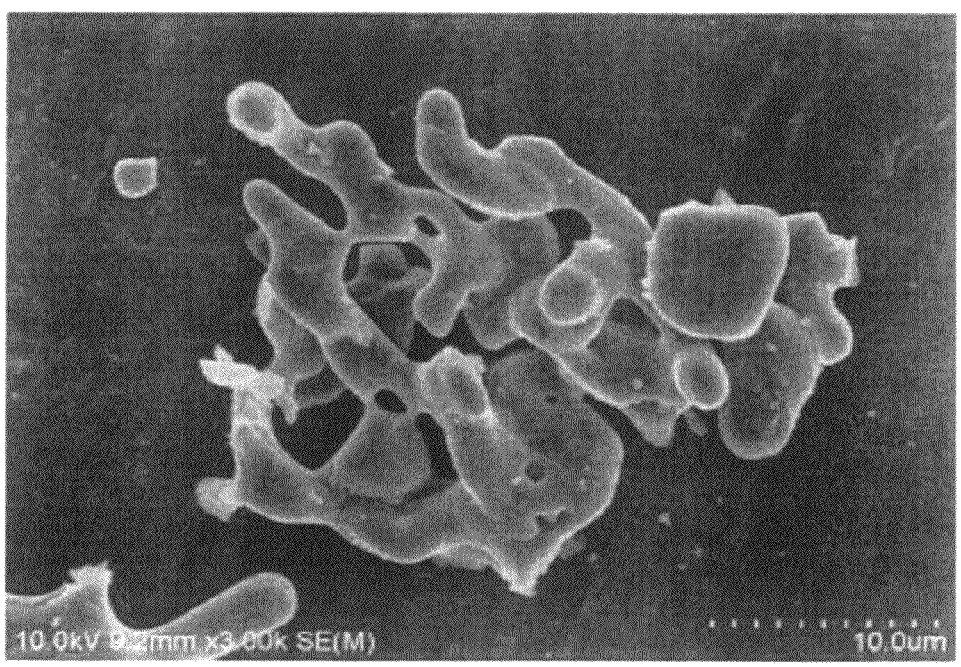
FIG. 20 is another photomicrograph taken using a scanning electron microscope, showing the potassium titanate of Example 4 in accordance with the present invention.

FIGS. 19 and 20 are SEM photographs of the potassium titanate of this Example.

A mean particle diameter (median diameter) of the potassium titanate of this Example was 11.5 µm.

Comparative Example 1

Potassium dititanate ($K_2Ti_2O_5$) was prepared in the same manner as in Example 1 and used to prepare 500 ml of a 10 wt. % slurry which was subsequently stirred for one hour and adjusted to a pH of 13.4. This aqueous slurry was filtrated, dried and then fired in an electric furnace at 600° C. for 1 hour. The fired product was disintegrated by a hammer mill to obtain 32.39 g of potassium titanate.

The obtained potassium titanate was confirmed as having a composition of $K_2Ti_{3.63}O_{8.26}$ by fluorescent X-ray analysis.

Figure 11:
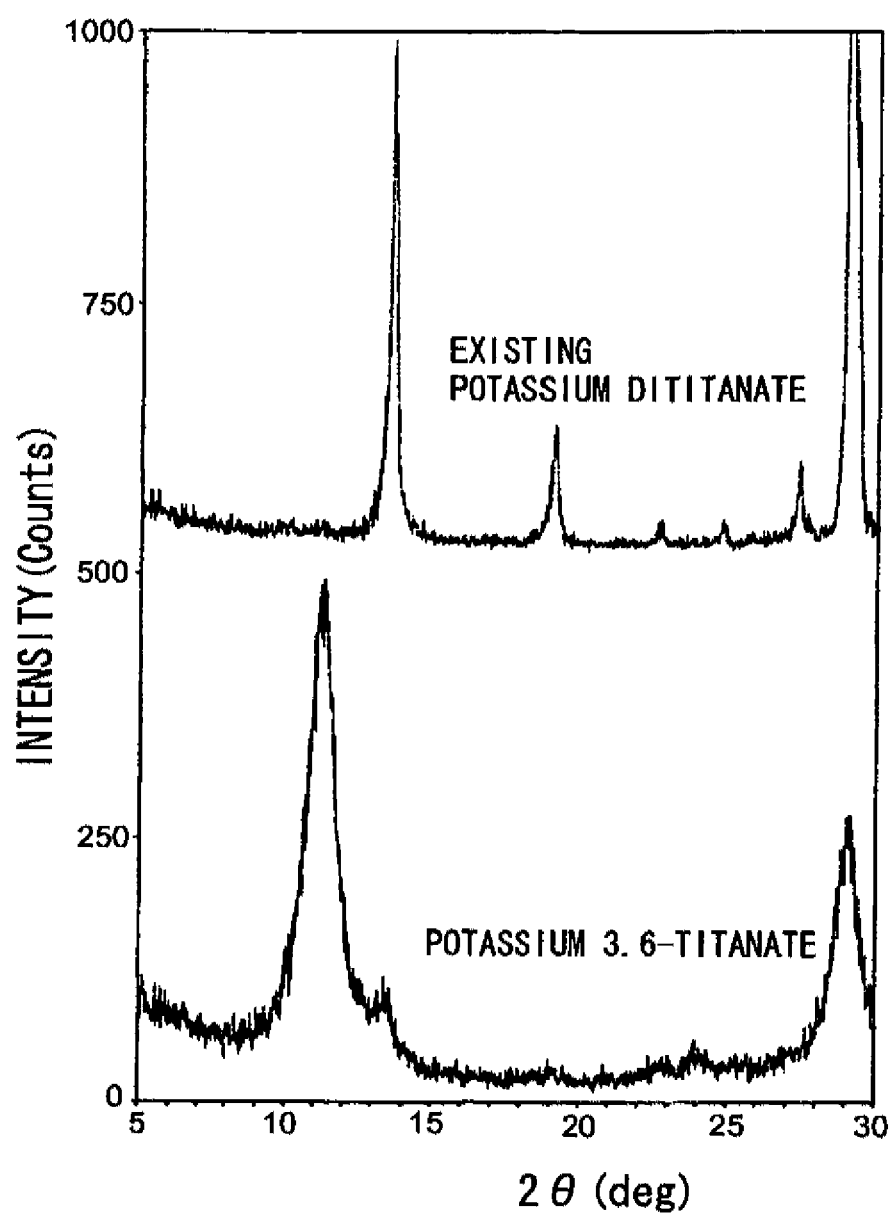
FIG. 11 is an X-ray diffraction chart of the potassium titanate obtained in Comparative Example 1.

FIG. 11 shows an X-ray diffraction chart of the obtained potassium titanate (potassium 3.6-titanate). FIG. 11 also shows an X-ray diffraction chart of potassium dititanate (existing potassium dititanate). As shown in FIG. 11, the potassium titanate of this Comparative Example had the highest intensity peak at an angle of 11.28° and its half width was 0.941°.

Figure 21:
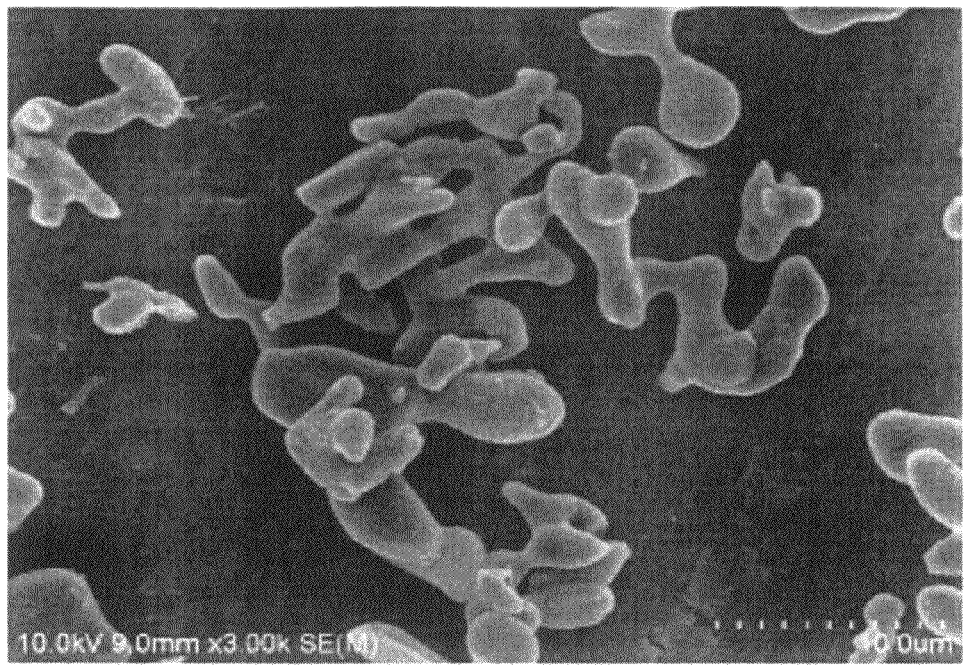
FIG. 21 is a photomicrograph taken using a scanning electron microscope, showing the potassium titanate of Comparative Example 1.
Figure 22:
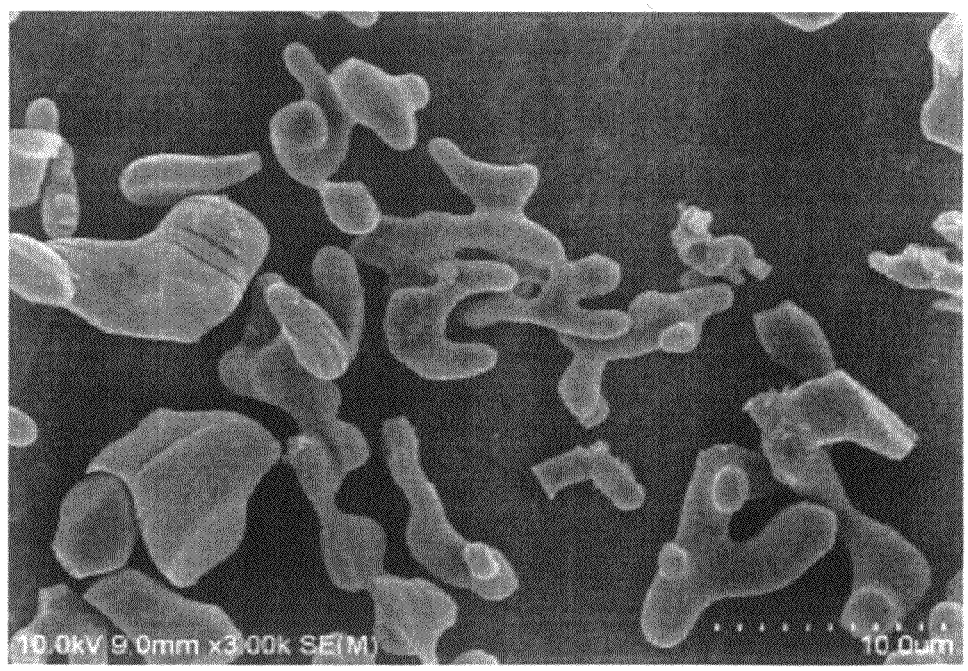
FIG. 22 is another photomicrograph taken using a scanning electron microscope, showing the potassium titanate of Comparative Example 1.

FIGS. 21 and 22 are SEM photographs of the potassium titanate of this Comparative Example.

A mean particle diameter (median diameter) of the potassium titanate of this Comparative Example was 13.7 µm.

Comparative Example 2

Potassium dititanate ($K_2Ti_2O_5$) was prepared in the same manner as in Example 1 and used to prepare 500 ml of a 15 wt. % slurry. Its pH was adjusted to a value of 5.5 by addition of 15.0 g of a 70 wt. % aqueous solution of $H_2SO_4$ and subsequent one-hour stirring. This aqueous slurry was filtrated, dried and then fired in an electric furnace at 600° C. for 1 hour. The fired product was disintegrated by a hammer mill to obtain 27.44 g of potassium titanate.

The obtained potassium titanate was confirmed as having a composition of $K_2Ti_{15.4}O_{31.7}$ by fluorescent X-ray analysis.

Figure 12:
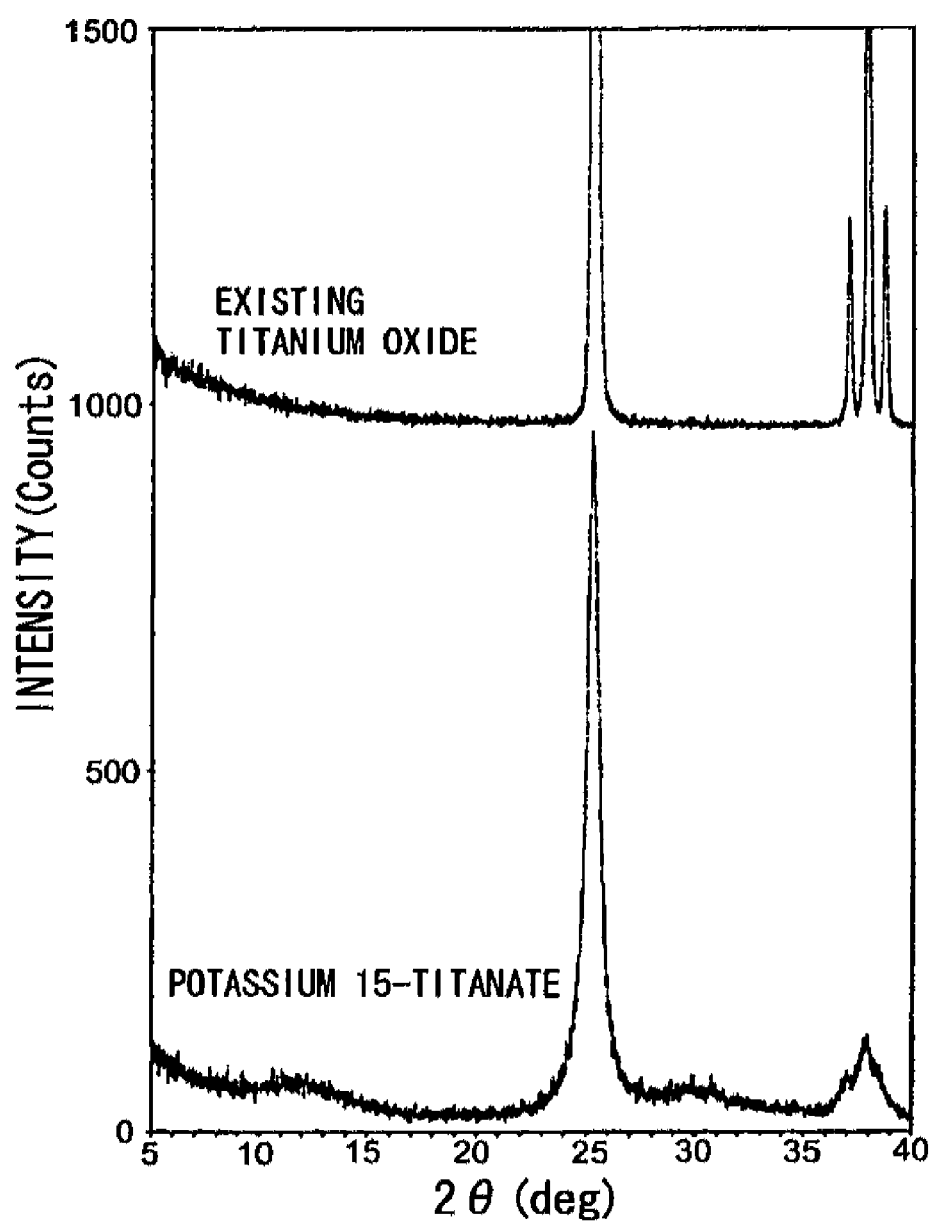
FIG. 12 is an X-ray diffraction chart of the potassium titanate obtained in Comparative Example 2.

FIG. 12 shows an X-ray diffraction chart of the obtained potassium titanate (potassium 15-titanate). FIG. 12 also shows an X-ray diffraction chart of titanium oxide (existing titanium oxide). As shown in FIG. 12, the potassiumtitanate of this Comparative Example had the broad peak at an angle of 11.68° and its half width was 1.106°.

Figure 23:
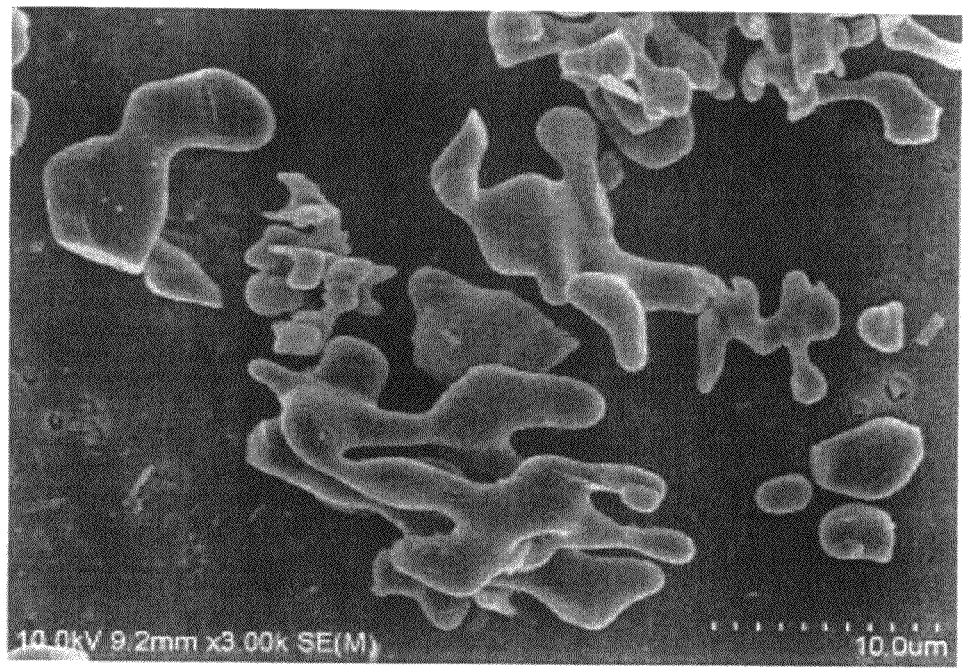
FIG. 23 is a photomicrograph taken using a scanning electron microscope, showing the potassium titanate of Comparative Example 2.
Figure 24:
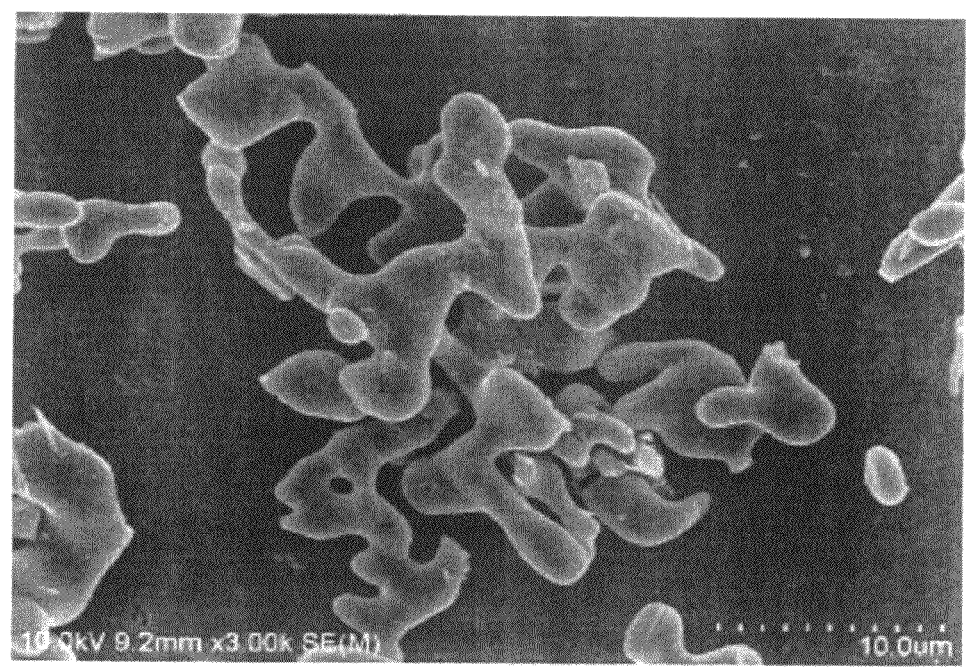
FIG. 24 is another photomicrograph taken using a scanning electron microscope, showing the potassium titanate of Comparative Example 2.

FIGS. 23 and 24 are SEM photographs of the potassium titanate of this Comparative Example.

A mean particle diameter (median diameter) of the potassium titanate of this Comparative Example was 11.5 µm.

Comparative Example 3

26.32 g of titanium oxide, 23.68 g of potassium carbonate and 100 g of deionized water were mixed in an eggplant flask, thickened by an evaporator and dried to obtain a solid mixture. 50 g of the mixture was packed in a crucible and fired in an electric furnace at 780° C. for 4 hours.

Figure 13:
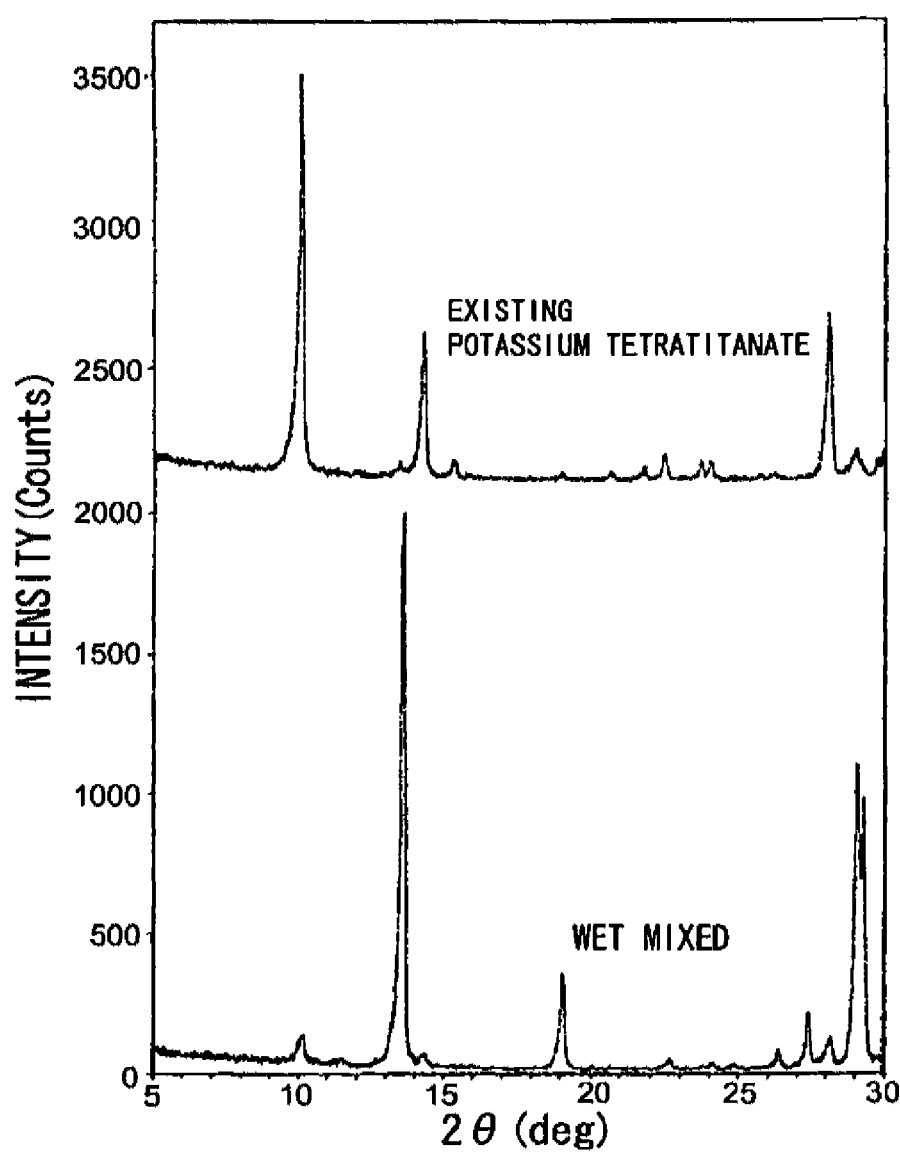
FIG. 13 is an X-ray diffraction chart of the potassium titanate obtained in Comparative Example 3.

FIG. 13 shows an X-ray diffraction chart of the obtained product.

As shown in FIG. 13, the product (wet mixed) was found to be a mixture of $K_2Ti_2O_5$ and fibrous potassium tetratitanate. FIG. 13 also shows an X-ray diffraction chart of fibrous potassium tetratitanate (existing potassium tetratitanate).

Comparative Example 4

542.00 g of titanium oxide, 216.80 g of potassium carbonate and 41.20 g of lithium carbonate were mixed in a Henshel mixer. 50 of the resulting mixture was packed in a crucible and fired in an electric furnace at 920° C. for 4 hours. The obtained product was identified as $K_{0.8}Li_{0.27}Ti_{1.73}O_{3.9}$ by X-ray diffraction.

The obtained product, $K_{0.8}Li_{0.27}Ti_{1.73}O_{3.9}$, was used to prepare 500 ml of a 15 wt. % slurry. 37 g of a 70 wt. % aqueous solution of $H_2SO_4$ was added to the slurry, followed by two-hour stirring. The resulting aqueous slurry was filtrated, washed with water and dried to obtain $H_{0.97}Ti_{1.73}O_{3.95}$.

$H_{0.97}Ti_{1.73}O_{3.95}$ was then used to prepare 500 ml of a 15 wt. % slurry. 16.7 g of a 85 wt. % aqueous solution of KOH was added to the slurry, followed by 4-hour stirring. The resulting aqueous slurry was filtrated, washed with water, dried and then fired in an electric furnace at 600° C. for 1 hour.

The fired product was disintegrated by a hammer mill to obtain 26.6 g of platy potassium titanate.

The obtained platy potassium titanate was confirmed as having a composition of $K_2Ti_{8.1}O_{17.2}$ by fluorescent X-ray analysis. Its mean particle diameter (median diameter) was 3.2 µm.

Figure 14:
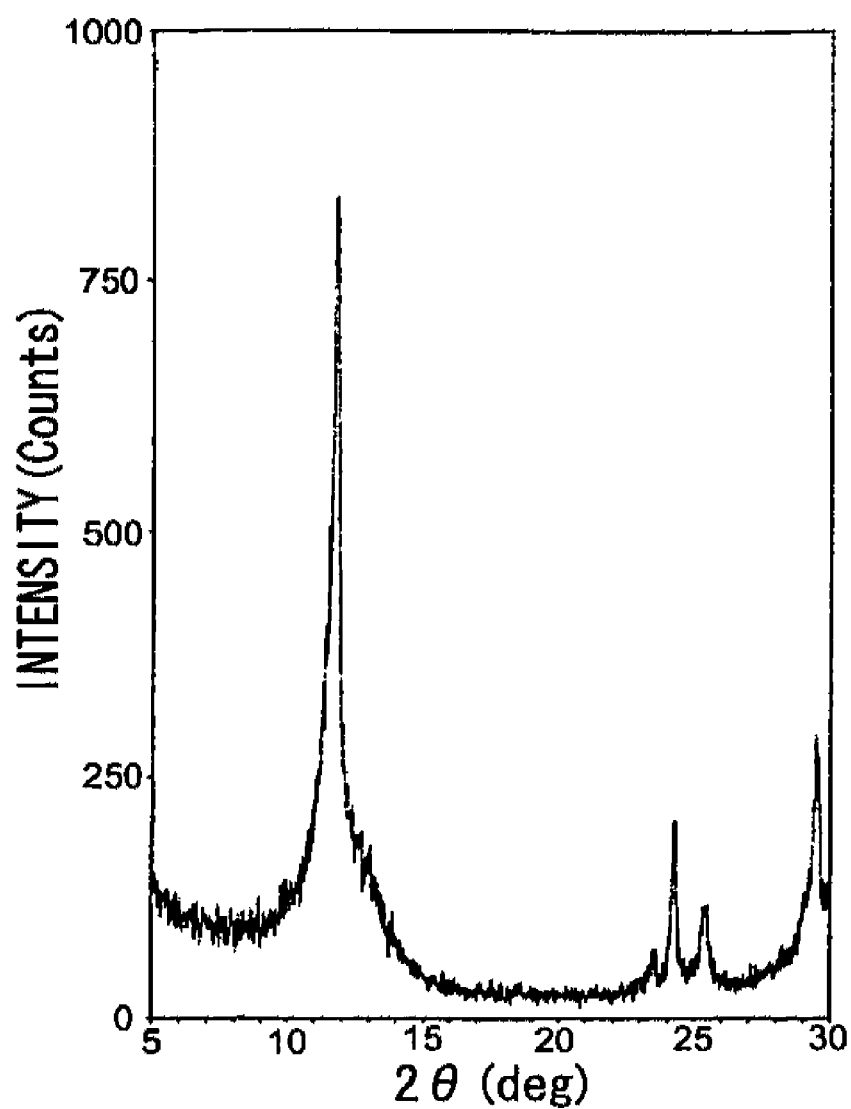
FIG. 14 is an X-ray diffraction chart of the potassium titanate obtained in Comparative Example 4.

FIG. 14 shows an X-ray diffraction chart of the obtained platy potassium titanate.

A mixing system used to obtain the raw material mixture, a value of n in $K_2Ti_nO_{(2n+1)}$, a mean particle diameter and a particle configuration in each of Examples 1-4 and Comparative Examples 1-4 are shown in Table 1.

TABLE 1

| | No | Mixing System | Value of n*1 | Mean Particle Diameter (μm) | Configuration |
|---|---|---|---|---|---|
| Comp. Ex. | 1 | Vibration Mill | 3.6 | 13.7 | Amoebic |
| Ex. | 3 | Vibration Mill | 4.8 | 12.2 | Amoebic |
| | 2 | Vibration Mill | 6.1 | 13.2 | Amoebic |
| | 1 | Vibration Mill | 7.9 | 11 | Amoebic |
| | 4 | Vibration Mill | 10.9 | 11.5 | Amoebic |
| Comp. Ex. | 2 | Vibration Mill | 15.4 | 11.5 | Amoebic |
| Comp. Ex. | 3 | Wet Mixed | — | — | Amoebic + Fibrous |
| | 4 | Henshel Mixer | 8.1 | 3.3 | Platy |

*1 Value of n in $K_2Ti_nO_{(2n+1)}$

Also, Table 2 lists the location and half width of the highest intensity peak in the X-ray diffraction chart for the potassium titanates obtained in Examples 1-4 and Comparative Examples 1-2, fibrous potassium tetratitanate, fibrous potassium hexatitanate and fibrous potassium octatitanate.

TABLE 2

| | No | Value of n*1 | 2θ | Half Width |
|---|---|---|---|---|
| Comp. Ex. | 1 | 3.6 | 11.28 | 0.941 |
| Ex. | 3 | 4.8 | 11.38 | 1.082 |
| | 2 | 6.1 | 11.58 | 1.388 |
| | 1 | 7.9 | 12.12 | 3.247 |
| | 4 | 10.9 | 11.42 | 1.106 |
| Comp. Ex. | 2 | 15.4 | 11.68 | 1.106 |
| Fibrous Potassium Tetratitanate | | 4 | 10.089 | 0.188 |
| Fibrous Potassium Hexatitanate | | 6 | 11.484 | 0.188 |
| Fibrous Potassium Octatitanate | | 8 | 11.335 | 0.235 |

*1 Value of n in $K_2Ti_nO_{(2n+1)}$

As can be clearly seen from the results shown in Table 2, the potassium titanate in accordance with the present invention has the highest X-ray diffraction intensity peak (2θ) in the range of 11.0°-13.5° and its half width is not less than 0.5°.

(Performance as a Friction Modifier in Friction Material)

All "parts" in the following Examples refer to "parts by weight".

Application Example 1

Potassium Octatitanate 20 parts of the amoebiform potassium titanate obtained in Example 1, $K_2Ti_{7.9}O_{16.8}$, 10 parts of aramid fibers, 20 parts of a phenol resin and 50 parts of barium sulfate were mixed, pressed under a pressure of 25 MPa for 1 minute, integrated in a mold under a pressure of 20 MPa at a temperature of 170° C. for 5 minutes and subsequently subjected to a heat treatment at 180° C. for 3 hours. The product was removed from the mold and then subjected to abrasive machining to prepare a disk pad A (JIS D 4411 test piece).

Application Example 2

Potassium Hexatitanate 20 parts of the amoebiform potassium titanate obtained in Example 2, $K_2Ti_{6.1}O_{13.2}$, 10 parts of aramid fibers, 20 parts of a phenol resin and 50 parts of barium sulfate were mixed, pressed under a pressure of 25 MPa for 1 minute, integrated in a mold under a pressure of 20 MPa at a temperature of 170° C. for 5 minutes and subsequently subjected to a heat treatment at 180° C. for 3 hours. The product was removed from the mold and then subjected to abrasive machining to prepare a disk pad B (JIS D 4411 test piece).

Application Example 3

Potassium Pentatitanate 20 parts of the amoebiform potassium titanate obtained in Example 3, $K_2Ti_{4.8}O_{10.6}$, 10 parts of aramid fibers, 20 parts of a phenol resin and 50 parts of barium sulfate were mixed, pressed under a pressure of 25 MPa for 1 minute, integrated in a mold under a pressure of 20 MPa at a temperature of 170° C. for 5 minutes and subsequently subjected to a heat treatment at 180° C. for 3 hours. The product was removed from the mold and then subjected to abrasive machining to prepare a disk pad C (JIS D 4411 test piece).

Application Example 4

Potassium Undecatitanate 20 parts of the amoebiform potassium titanate obtained in Example 4, $K_2Ti_{10.9}O_{22.8}$, 10 parts of aramid fibers, 20 parts of a phenol resin and 50 parts of barium sulfate were mixed, pressed under a pressure of 25 MPa for 1 minute, integrated in a mold under a pressure of 20 MPa at a temperature of 170° C. for 5 minutes and subsequently subjected to a heat treatment at 180° C. for 3 hours. The product was removed from the mold and then subjected to abrasive machining to prepare a disk pad D (JIS D 4411 test piece).

Comparative Application Example 1

20 parts of the platy potassium titanate obtained in Comparative Example 4, $K_2Ti_{8.1}O_{17.2}$, 10 parts of aramid fibers, 20 parts of a phenol resin and 50 parts of barium sulfate were mixed, pressed under a pressure of 25 MPa for 1 minute, integrated in a mold under a pressure of 20 MPa at a temperature of 170° C. for 5 minutes and subsequently subjected to a heat treatment at 180° C. for 3 hours. The product was removed from the mold and then subjected to abrasive machining to prepare a disk pad E (JIS D 4411 test piece).

Test Example 1

Friction Material—Frictional Wear Test

For the disk pads A, B, C, D and E obtained in Application Examples 1-4 and Comparative Application Example 1, a constant-speed frictional wear test (friction disk surface: made of FC-25 gray cast iron, surface pressure: 0.98 MPa, friction speed: 7 m/sec) was conducted according to the standard described in JIS D 4411 "Automobile Brake Lining" to measure a wear rate ($cm^3$/kgm) and a friction coefficient (μ). The results are shown in FIGS. 15 and 16.

Figure 15:
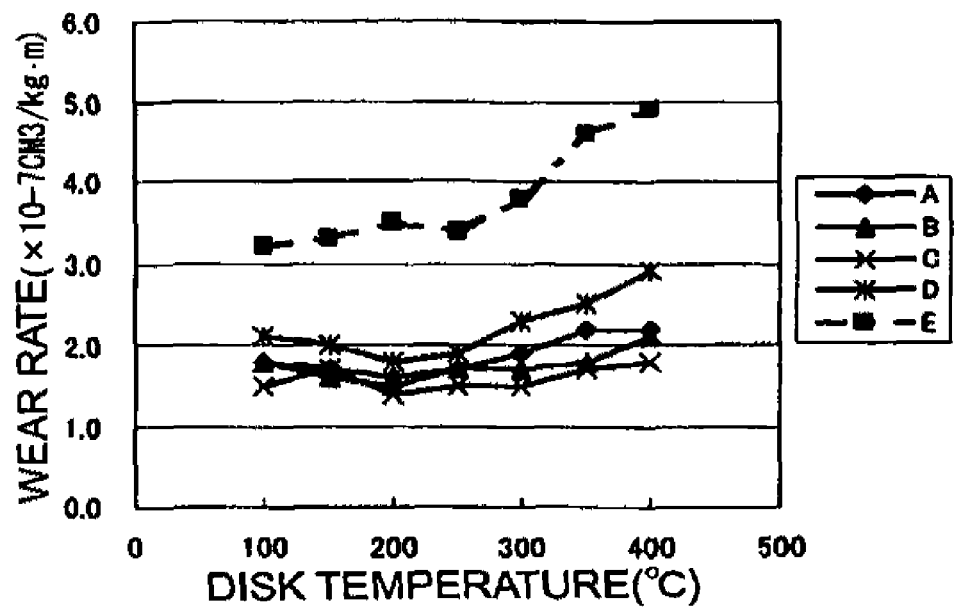
FIG. 15 is a graph, showing the disk temperature vs. wear rate relationship for the disk pads A-E.
Figure 16:
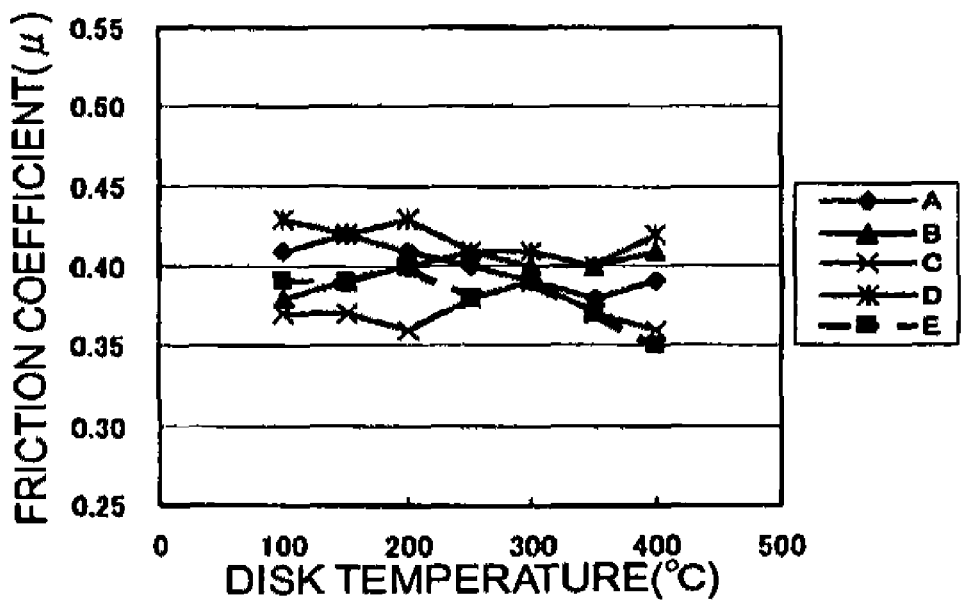
FIG. 16 is a graph, showing the disk temperature vs. wear coefficient relationship for the disk pads A-E.

As can be clearly seen from FIGS. 15 and 16, the disk pads A, B, C and D using the amoebiform potassium titanate of the present invention exhibit lower wear rates and improved wear resistance, compared to the disk pad E using the platy potassium titanate.

(Performance as a Reinforcer in Friction Material)

All "parts" in the following Examples refer to "parts by weight".

Application Example 5

30 parts of the amoebiform potassium titanate obtained in Example 1, $K_2Ti_{7.9}O_{16.8}$, 50 parts of a PPS resin, 10 parts of polytetrafluoroethylene and 10 parts of potassium sulfate were extruded using a 60 mm single screw extruder into pellets. The obtained pellets were injection molded under the conditions of a molding temperature of 340° C., an injection pressure (primary pressure) of 1,200 kgf/cm², a dwell pressure (secondary pressure) of 500 kgf/cm² and an injection/dwell time of 20 seconds to prepare a wear test piece (hollow cylinder having an outer diameter of 25.6 mm, an inner diameter of 20 mm and a height of 15 mm).

Comparative Application Example 2

30 parts of potassium hexatitanate fibers (section diameter of 0.3-1 μm, aspect ratio of 10), 50 parts of a PPS resin, 10 parts of polytetrafluoroethylene and 10 parts of potassium sulfate were extruded using a 60 mm single screw extruder into pellets. The obtained pellets were injection molded under the conditions of a molding temperature of 340° C., an injection pressure (primary pressure) of 1,200 kgf/cm², a dwell pressure (secondary pressure) of 500 kgf/cm² and an injection/dwell time of 20 seconds to prepare a wear test piece (hollow cylinder having an outer diameter of 25.6 mm, an inner diameter of 20 mm and a height of 15 mm).

Test Example 2

Resin Composition—Frictional Wear Test)

For the wear test pieces obtained in Application Example 5 and Comparative Application Example 2, a Suzuki frictional wear test (load of 10 kgf/cm², peripheral speed of 30 cm/sec, running distance of 10 km) was conducted to determine a friction coefficient, a specific wear rate (mm³/kgf·km) and a specific wear rate (mm³/kgf·km) of an opposing material. The results are shown in Table 3.

TABLE 3

|  |  | Ex. 1 | Comp. Ex. 1 |
|---|---|---|---|
| Composition | Ex. 1 - Amoebic Potassium Titanate | 30 | — |
|  | Potassium Hexatitanate Fiber | — | 30 |
|  | PPS Resin | 50 | 50 |
|  | Polytetrafluoroethylene | 10 | 10 |
|  | Potassium sulfate | 10 | 10 |
| Test | Friction Coefficient | 0.19 | 0.2 |
|  | Specific Wear rate (mm³/kgf · km) | 0.012 | 0.025 |
|  | Specific Wear Rate of Opposing Material (mm³/kgf · km) | 0 | 0 |

As can be clearly seen from Table 3, the test piece using the amoebiform potassium titanate of the present invention shows a lower specific wear rate, compared to the test piece using conventional potassium hexatitanate fibers, while the opposing material (carbon steel, S45C) shows no specific wear rate.

Test Example 3

Resin Composition—Tensile Test

Injection molding was performed under the same conditions as in Application Example 5 and Comparative Application Example 2 to prepare respective samples for a tensile strength test: JIS K 7113 and an Izod impact test: JIS K 7110 and determine their respective values.

TABLE 4

|  |  | Ex. 1 | Comp. Ex. 1 |
|---|---|---|---|
| Test | Tensile Strength (kgf/cm²) | 1220 | 1180 |
|  | Izod Impact Value (kgf/cm²) | 8.5 | 6.6 |

As can be clearly seen from Table 4, the test piece using the amoebiform potassium titanate of the present invention shows a higher Izod impact value.

What is claimed is:

1. A method for manufacture of potassium titanate including the steps of:
   mixing a titanium source and a potassium source while milling them mechanochemically by a vibration mill;
   firing the milled mixture to prepare potassium dititanate; and
   subjecting the potassium dititanate to an acid treatment so as to dissolve a potassium content from the potassium dititanate and firing the resultant to manufacture potassium titanate represented by $K_2Ti_nO_{(2n+1)}$ (n=4.0-11.0) in which it has the highest X-ray diffraction intensity peak (2θ) in the range of 11.0°-13.5°, its half width, determined by performing peak searching after smoothing using a weighted average method and background removal using a Sonnevelt-Visser method, is not less than 0.5°, it has a mean particle diameter, measured by a laser diffraction particle-size distribution measurement device, in the range of 5-20 μm, and it has an indeterminate configuration which is not a fibrous, platy or particulate form.

2. The method for manufacture of potassium titanate as recited in claim 1, characterized in that the milled mixture is fired at a temperature in the range of 650-1,000° C.

3. The method for manufacture of potassium titanate as recited in claim 1, characterized in that the potassium dititanate, subsequent to the acid treatment, is fired at a temperature in the range of 400-700° C.

4. A method for manufacture of potassium titanate including the steps of:
   mixing a titanium source and a potassium source while milling them mechanochemically by a vibration mill;
   firing the milled mixture to prepare potassium dititanate; and
   subjecting the potassium dititanate to an acid treatment so as to dissolve a potassium content from the potassium dititanate and firing the resultant to manufacture potassium titanate represented by $K_2Ti_nO_{(2n+1)}$ (n=4.0-11.0) in which it has the highest X-ray diffraction intensity peak (2θ) in the range of 11.0-13.5°, its half width, determined by performing peak searching after smoothing using a weighted average method and background removal using a Sonnevelt-Visser method, is not less than 0.8°, and it has a mean particle diameter, measured by a laser diffraction particle-size distribution measurement device, in the range of 5-20 μm.

5. The method for manufacture of potassium titanate as recited in claim 4, characterized in that the milled mixture is fired at a temperature in the range of 650-1,000° C.

6. The method for manufacture of potassium titanate as recited in claim 4, characterized in that the potassium dititanate, subsequent to the acid treatment, is fired at a temperature in the range of 400-700° C.

* * * * *